US008675785B2

(12) United States Patent
Reial et al.

(10) Patent No.: US 8,675,785 B2
(45) Date of Patent: Mar. 18, 2014

(54) METHOD AND APPARATUS FOR TURBO RECEIVER PROCESSING

(75) Inventors: Andres Reial, Malmö (SE); Stephen Grant, Pleasanton, CA (US); Matthias Kamuf, Waghäusel (DE); Yi-Pin Eric Wang, Fremont, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 0 days.

(21) Appl. No.: 13/470,638

(22) Filed: May 14, 2012

(65) Prior Publication Data

US 2013/0301758 A1    Nov. 14, 2013

(51) Int. Cl.
*H04L 27/06* (2006.01)
*H04L 27/00* (2006.01)
*H03M 13/00* (2006.01)

(52) U.S. Cl.
USPC ........... 375/341; 375/340; 375/316; 714/752; 714/746; 714/699

(58) Field of Classification Search
USPC .......... 375/259, 265, 341, 340, 316; 714/786, 714/746, 699, 752
See application file for complete search history.

(56) References Cited

U.S. PATENT DOCUMENTS

| 8,325,840 B2 * | 12/2012 | Bursalioglu et al. | ........... 375/267 |
|---|---|---|---|
| 2005/0068918 A1 | 3/2005 | Mantravadi et al. | |
| 2008/0016381 A1 * | 1/2008 | Fitton et al. | .................... 713/320 |
| 2008/0115038 A1 | 5/2008 | Kee et al. | |
| 2011/0158359 A1 | 6/2011 | Khayrallah et al. | |
| 2011/0222618 A1 | 9/2011 | Huss et al. | |

FOREIGN PATENT DOCUMENTS

WO        9955008 A1    10/1999

OTHER PUBLICATIONS

Wang et al., "Multi-User Detection for Improving VoIP Capacity and Coverage in WCDMA Uplink," IEEE, Vehicular Technology Conference, Apr. 2009.*
Berrou, C. et al. "Near Shannon Limit Error—Correcting Coding and Decoding: Turbo-Codes (1)." IEEE International Conference on Communications, Geneva, Switzerland, May 23-26, 1993.
Laot, C. et al. "Low-Complexity MMSE Turbo Equalization: A Possible Solution for EDGE." IEEE Transactions on Wireless Communications, vol. 4, No. 3, May 2005.
Park, C. S. et al. "Evolution of Uplink MIMO for LTE-Advanced." IEEE Communications Magazine, vol. 29, Issue 2, Feb. 2011.

(Continued)

*Primary Examiner* — Chieh M Fan
*Assistant Examiner* — Michelle M Koeth
(74) *Attorney, Agent, or Firm* — Murphy, Bilak & Homiller, PLLC

(57) ABSTRACT

One aspect of the present invention concerns the management of processing resource allocations for a Turbo receiver, where such resources are consumed from a finite resource budget within a defined processing time interval. The contemplated Turbo receiver attempts to allocate more processing resources to those demodulation and/or Turbo decoding tasks that make more valuable contributions with respect to the ultimate goal of successfully decoding all data streams that are of interest in a received signal. The advantageous management approach allows the Turbo receiver to obtain better results for a given consumption of processing resources, and further permits the Turbo receiver to quit upon either achieving a successful outcome within a defined processing time interval or exhausting the budgeted resources.

22 Claims, 8 Drawing Sheets

(56) References Cited

OTHER PUBLICATIONS

Fang, K., et al., "Iterative OFDM Receiver with Combined Interference Suppression and Cancellation," 2011 IEEE 22nd International Symposium on Personal Indoor and Mobile Radio Communications (PIMRC). Sep. 11-14, 2011. pp. 1412-1416. Toronto, Ontario, Canada.

* cited by examiner

METHOD AND APPARATUS FOR TURBO RECEIVER PROCESSING

TECHNICAL FIELD

The present invention generally relates to communication systems, and particularly relates to communication receivers and their received signal processing.

BACKGROUND

In wireless communications, as well as in other communications systems, Turbo receiver (TRX) architectures have become popular in a variety of scenarios. The Turbo concept was originally presented in the context of Turbo codes—see C. Berrou, A. Glavieux, and P. Thitimajshima, "Near Shannon limit error-correcting coding and decoding: Turbo-codes", Proceedings of ICC 1993, Geneva, Switzerland, pp. 1064-1070. During the recent decades, the Turbo principle has moved beyond channel coding and is being used in a myriad of iterative approaches for general receiver applications.

All TRX algorithms are based on the principle of belief propagation. A number of "decoding" stages provide soft output information about some component of the received signal that is an improved, value-added version of the input soft information. The soft decoders aggregate the local "constituent code" constraints and any new information available from other decoders in the Turbo structure.

The "constituent code" and its corresponding "decoder" may refer to the traditional channel coding blocks, but also e.g. to the multipath channel and the corresponding equalizer, or the multiple-access channel and the corresponding interference cancellation (IC) operation. Some concrete examples of Turbo structures beyond channel coding are the Turbo equalizer, such as described in C. Laot, R. Le Bidan, and D. Leroux, "Low-complexity MMSE turbo equalization: A possible solution for EDGE," IEEE Trans. Wireless Commun., vol. 4, no. 3, pp. 965-974, May 2005. Turbo interference cancellation (Turbo-IC) with soft Turbo decoder (TDEC) for MIMO reception represents another useful example of TRX architectures, such as described in C. Park, Y.-P. E. Wang, G. Jongren, and D. Hammarwall, "Evolution of uplink MIMO for IMT-Advanced," IEEE Commun. Magazine, vol. 49, no. 2, pp. 112-121, February 2011. Turbo-IC receivers typically employ iterative soft IC methods to treat a mix of signal components and can approach the performance of joint detection/decoding but with dramatically lower complexity.

SUMMARY

One aspect of the present invention concerns the management of processing resource allocations for a Turbo receiver, where such resources are consumed from a finite resource budget within a defined processing time interval. The contemplated Turbo receiver attempts to allocate more processing resources to those demodulation and/or Turbo decoding tasks that make more valuable contributions with respect to the ultimate goal of successfully decoding all data streams that are of interest in a received signal. The advantageous management approach allows the Turbo receiver to obtain better results for a given consumption of processing resources, and further permits the Turbo receiver to quit upon either achieving a successful outcome within a defined processing time interval or exhausting the budgeted resources.

In one embodiment, a method of iteratively processing a communication signal in a Turbo receiver includes receiving a communication signal that conveys a first number of data streams and performing a total number of Turbo receiver iterations for the received communication signal within a defined processing time interval. Each Turbo receiver iteration includes demodulating a second number of the data streams from the received communication signal and Turbo decoding each one of the corresponding demodulated data streams using a number of Turbo decoding iterations. Further, one or more of the Turbo receiver iterations include canceling interference in the received communication signal, based on soft symbol estimates obtained from outcomes of the Turbo decoding.

The method also includes dynamically controlling a processing resource consumption of the Turbo receiver within the defined processing time interval, to increase a likelihood that all data streams that are of interest among the first number of data streams are successfully decoded without exceeding a total processing resource budget. Such control comprises at least one of: varying the total number of Turbo receiver iterations; varying the number of Turbo decoding iterations performed for any one or more of the demodulated data streams in each one of any one or more of the Turbo receiver iterations; and varying over any two or more of the Turbo receiver iterations a set size or set membership with respect to how many and which ones among the first number of data streams are included in the second number of the data streams.

An example Turbo receiver comprises a number of demodulation circuits and corresponding Turbo decoder circuits arranged in one or more receiver branches or stages, and further comprises a resource allocation control circuit that is configured to control resource allocation for demodulation and/or Turbo decoding operations performed by the Turbo receiver. Correspondingly, the Turbo receiver is configured to receive a communication signal conveying a first number of data streams, and to perform a total number of Turbo receiver iterations for the received communication signal within a defined processing time interval.

As noted, the demodulation and Turbo decoding operations associated with such processing consumes resources, whether measured in terms of compute cycles, memory usage, information bit processing capacity, etc. By any such measure, the Turbo receiver has finite processing resources available to it within any defined processing time interval, and the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget.

The data streams of interest are, for example, the data stream(s) targeted to the Turbo receiver but the received communication signal may include multiple other data streams that may be processed in one or more of the Turbo receiver iterations, e.g., for interference cancellation. As such, the particular mix and number of data streams selected for demodulation and Turbo decoding may change across the multiple Turbo receiver iterations—i.e., the "second number" of data streams may be a dynamically changing subset taken from the "first number" of data streams included in the received communication signal.

An example resource allocation control circuit is configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
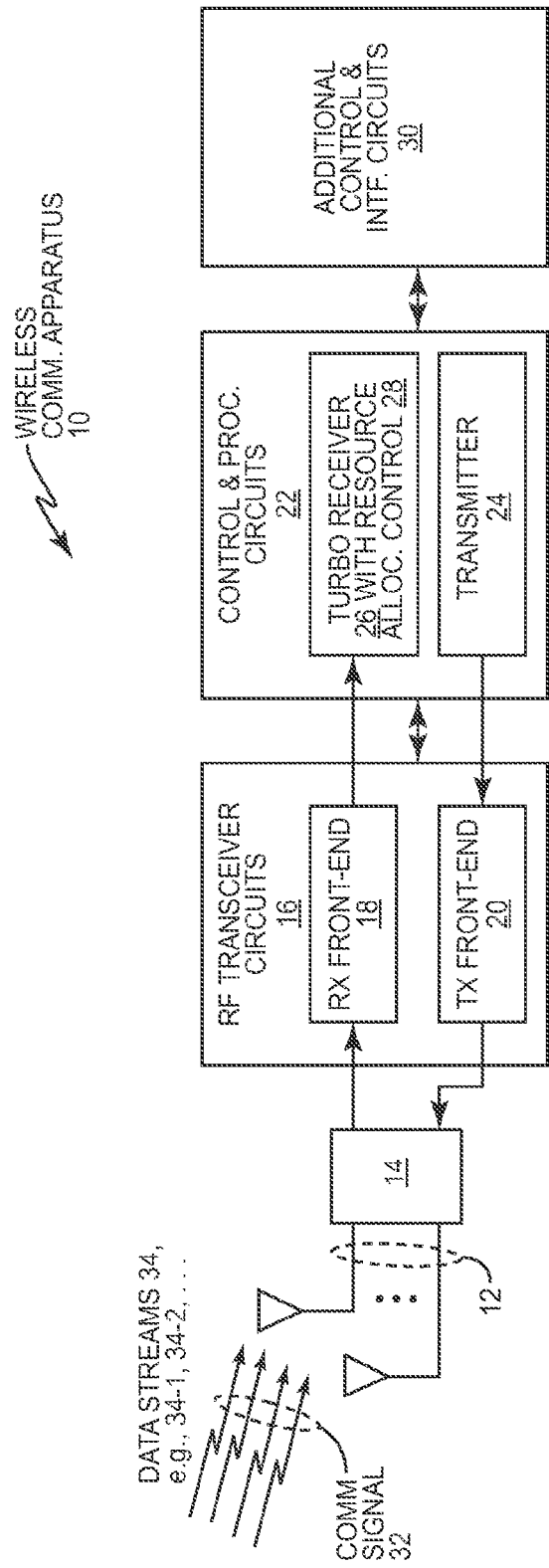
FIG. 1 is a block diagram of one embodiment of a wireless communication apparatus, such as a base station for use in cellular communication network, or a wireless communication device configured for operation in a cellular communication network.

FIG. 1 is a block diagram of one embodiment of a wireless communication apparatus 10, such as a base station for use in cellular communication network, or a wireless communication device configured for operation in a cellular communication network. In wireless communication networks based on 3GPP LTE standards, for example, the wireless communication apparatus 10 comprises an eNodeB in one example and comprises a User Equipment ("UE") in another example. In either case, the operational and structural details of interest relate to resource management in Turbo receiver processing.

For the illustrated example, the wireless communication apparatus 10 ("apparatus 10") includes one or more RX/TX antennas 12, an antenna interface circuit or module 14, which may comprise a duplexer and/or filtering and matching circuits. The apparatus 10 further includes radiofrequency (RF) transceiver circuits 16. In a UE example, the RF transceiver circuits 16 comprise, e.g., a cellular modem, while in an eNodeB or other network base station example the RF transceiver circuits 16 comprise, e.g., pools of signal transmission and reception resources, for supporting any number of UEs.

In the simplified illustration, the RF transceiver circuits 16 include an RX front-end 18 and a TX front-end 20. As an example, the RX front-end 18 comprises received signal filtering, amplification, down-conversion and digitization, such that downstream received-signal processing circuits receive digital sample streams corresponding to the antenna-received signal(s). Similarly, the TX front-end 20 in an example configuration comprises up-conversion and amplification circuitry that generates a transmit signal for transmission from the antenna(s) 12 responsive to, for example, a baseband TX signal.

Such a signal is generated by control and processing circuits 22 included in the apparatus 10. In an example embodiment, these circuits comprise one or more microprocessors, microcontrollers, Digital Signal Processors (DSPs), and/or one or more other digital processors. Functionally, the control and processing circuits 22 provide baseband digital processing for incoming data and control signaling received through the RX front-end 18, and likewise generate and/or manage outgoing data and control signaling to be sent through the TX front-end 20.

As is known, such circuitry is implemented using dedicated hardware, programmable hardware, or some mix thereof. In at least one embodiment, at least a portion of the control and processing circuits 22 is implemented using one or more programmable digital processors. These processors are configured by their execution of stored computer program instructions to carry out some or all of the Turbo receiver resource allocation management contemplated herein. In that regard, the control and processing circuits 22 in one or more embodiments include memory or other computer-readable medium storing the computer program instructions.

Allowing for flexibility in their implementation, the control and processing circuits 22 at least functionally include a transmitter 24 and a Turbo receiver 26 ("TRX 26"), including a resource allocation control circuit 28. The overall apparatus 10 also may include additional control and interface circuits 30. These additional circuits 30 vary in terms of their type and complexity, depending upon the nature of the apparatus 10—i.e., for a UE the additional circuits 30 may comprise user interface circuits, etc., and for an eNodeB or other network node they may comprise backhaul and/or sidehaul interfaces, power management circuits, etc.

FIG. 1 also illustrates the reception of an incoming communication signal 32 by the apparatus 10, where that signal includes one or more data streams 34, e.g., 34-1, 34-2, and so on. This disclosure contemplates a broad construction of the term "data stream." In a non-limiting example embodiment, each data stream 34 comprises a MIMO data stream associated with MIMO transmission from multiple antennas or antenna elements at a remote transmitter. However, in general the term connotes any component of a received communication signal that constitutes or otherwise conveys individually decodable code-words or other distinct, separable data. As such, a data stream 34 is a constituent, separable signal component in the received signal.

Figure 2:
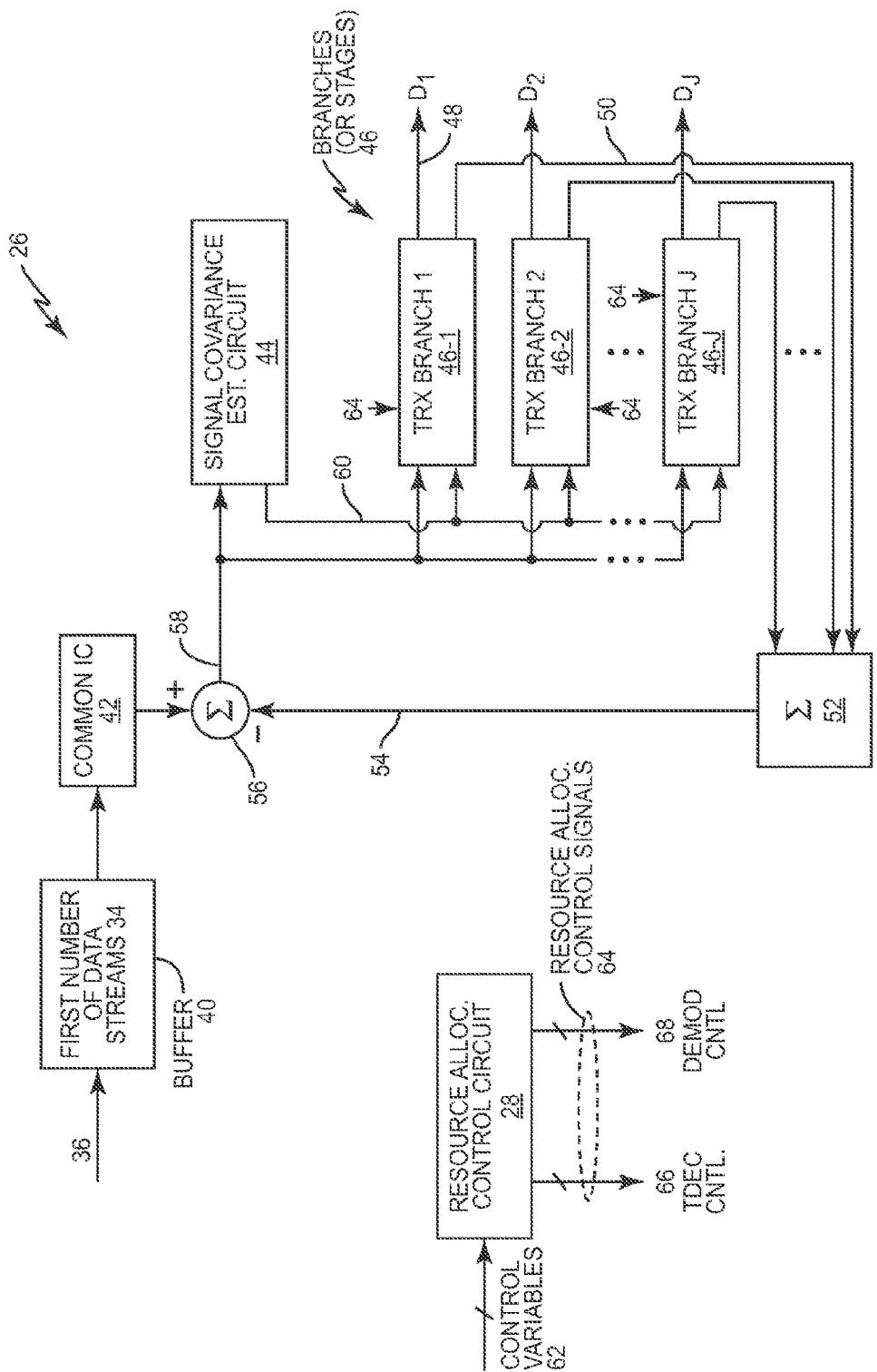
FIG. 2 is a block diagram of one embodiment of a Turbo receiver, such as may be included in the wireless communication apparatus of FIG. 1.

FIG. 2 illustrates example circuits for the TRX 26, at least at a functional level. According to the example details, a received communication signal 36 is provided to the TRX 26, e.g., by the RX front-end 18, in the form of digitized waveform values corresponding to the antenna-received communication signal 32. A buffer 40 temporarily holds sample values 34 for the received communication signal 36, e.g., for one or more symbol times as defined by the transmission format and protocol. These sample values, or values derived therefrom, are available to the TRX 26 over multiple Turbo receiver iterations ("TRX iterations"), with the overall goal being the successful decoding of the information symbols conveyed by the data stream 34 or streams 34 that are of "interest" to the apparatus 10.

The example TRX 26 further includes a common Interference Cancellation (IC) circuit 42, a signal covariance estimation circuit 44, and a plurality of TRX branches 46, e.g., 46-1, 46-2, . . . , 46-J, where J is some number >1. While parallel receiver branches 46 are shown in the diagram, it is also contemplated herein to use serial stages in certain receiver structures. Thus, while "branch" is used for concise reference to the illustrated example, it will be understood that the teachings herein directly apply to certain receiver architectures involving multiple stages rather than branches, and the term "branch" therefore encompasses "stage" unless otherwise noted.

Taking the MIMO context as an example, at every iteration of the TRX 26, each of the multiple data streams 34 selected for processing in that iteration is equalized, demodulated and soft-decoded by a Turbo decoder (TDEC) in a respective one of the branches 46. Even when decoding is not successful, the soft TDEC can output improved-quality soft bit estimates for the coded bits in the received communication signal 36, as compared to the input soft values provided by the demodulator portion of the TRX 26 for that TRX iteration. Note that one TRX iteration includes potentially many TDEC iterations per branch 46, for the demodulated data stream being Turbo decoded in each branch 46.

The output soft bit values 48—referred to as Turbo decoding outcomes—are used for producing soft symbol estimates for that receiver branch 46, for the current TRX iteration. These soft symbol estimates represent the parts or fraction of the data stream contents that the TRX can confidently deduce—that is, the soft symbol estimate magnitude reflects its confidence level. The soft symbol estimates produced in each branch 46, in any given TRX iteration, are filtered with the effective channel response to obtain their estimated contribution to the received communication signal 36. In a CDMA system, spreading and scrambling are applied to the soft symbol estimates before the channel-filtering step. The estimated contribution signals 50 from all branches 46 are summed in a combining circuit 52 to form a common interference estimate signal 54 for all branches 46. The signal 54 is subtracted from the received communication signal 36 (after processing by the common IC circuit 42) at a combining circuit 56.

Of course, the above subtraction/combining is only one of the various possible ways to implement IC. For example, each branch 46 may perform "own branch signal-add back." Further approaches may be used that are mathematically equivalent to the illustrated approach, for example, formulating and subtracting a branch-specific interference estimate outside each branch 46. In the resource management and allocation at issue herein, the particular approach taken for implementation of IC is not a significant factor.

The cleaned-up signal 58 is then used to repeat demodulation and Turbo decoding at the next TRX iteration. That is, over multiple iterations of the TRX 26, the branches 46 operate on the cleaned-up version 58 of the received communication signal 36 and it will be seen that the branches 46 are also provided with the relevant estimates of signal covariance via one or more signal covariance estimate signals 60, as output by the signal covariance estimate circuit 44. Also note that because the cleaned-up signal 58 merely represents an iteratively updated version of the received communication signal 36, references herein to the received communication signal 36 should be understood as encompassing the cleaned-up signal 58, at least where the reference involves operation of the TRX 26 and iterations thereof.

The diagram also provides further example details regarding the resource allocation control circuit 28. Here, the resource allocation control circuit 28 is configured to receive one or more control variables 62 (such as coding rates, signal quality metrics, as described later), and to output one or more resource allocation control signals 64. The output signals include at least one of: one or more Turbo decoder (TDEC) control signals 66, to control the allocation or consumption of processing resources by Turbo decoding in one or more of the branches 46, in any one or more of the TRX iterations; and one or more DEMOD control signals 68, to control the allocation or consumption of processing resources by demodulation in one or more of the branches 46, in any one or more of the TRX iterations.

Figure 3A:
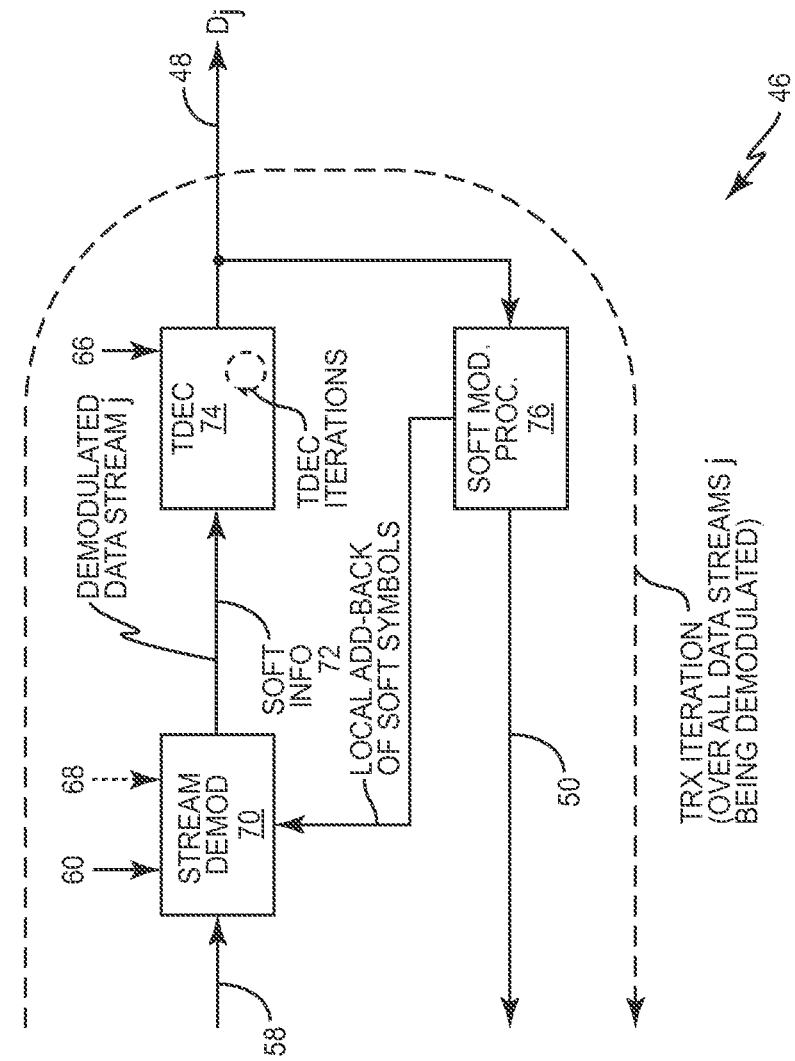
FIGS. 3A and 3B are block diagrams of one receiver branch, in example embodiments of a Turbo receiver.

In FIG. 3A, one sees example details for a branch 46, including a demodulation circuit 70. FIG. 3A also illustrates the relationship between Turbo decoder (TDEC) iterations and TRX iterations. The demodulation circuit 70 receives the communication signal 58, which corresponds directly to the received communication signal 36, after buffering and IC, and also receives a signal covariance estimate via signal 60. Further, it may receive one or more of the DEMOD control signals 68, to control its resource consumption. In embodiments that manage the consumption of demodulation resources, e.g., by increasing or decreasing the complexity of the applied demodulation processes, the DEMOD signal(s) 68 control the demodulation configuration. In embodiments that do not control the consumption of demodulation resources, the DEMOD signal(s) 68 are not present.

In each TRX iteration, the demodulation circuit 70 generates detection statistics for one of the data streams 34 that are being demodulated and Turbo decoded in the current TRX iteration. Thus, the demodulator 70 is shown as producing a demodulated data stream 72, also referred to as a demodulated data stream j for branch j. The demodulated data stream 72 comprises detection statistics, e.g., soft values, corresponding to the symbol(s) conveyed by the data stream 34 being demodulated.

A TDEC circuit 74 in branch j receives the demodulated data stream 72 and generates the corresponding soft bit estimates by (iteratively) Turbo decoding the demodulated data stream 72. Note that the number of TDEC iterations performed by the TDEC circuit 74 in any given one of the TRX iterations may be controlled, e.g., by a TDEC control signal 66.

A soft modulation processor 76 in branch j is configured to generate a corresponding one of the aforementioned estimated contribution signals 50, based on by performing soft symbol mapping using the soft bit estimates generated by Turbo decoding operations performed by branch j in the current TRX iteration.

Figure 3B:
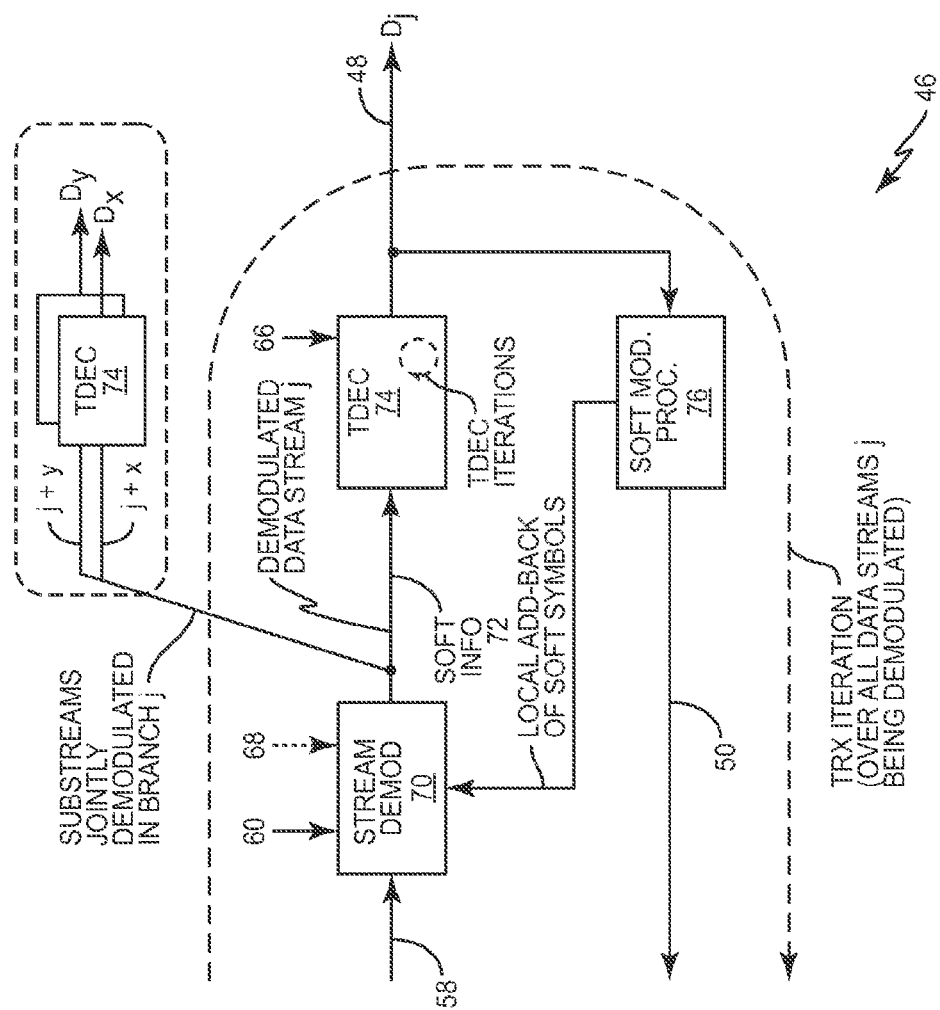

FIG. 3B illustrates another embodiment of demodulation in the context of the branches 46. In particular, FIG. 3B highlights a joint demodulation (JD) implementation of the demodulation circuit 70, which will be understood as including a number of JD processing blocks for jointly detecting/demodulating multiple substreams, either intra-stream JD where it jointly demodulates two or more substreams from a selected one of the data streams 34, or inter-stream JD where it jointly demodulates substreams taken from two or more of the data streams 34 selected for demodulation. As will be detailed later, a WCDMA-based example of a data stream 34 is where multiple, parallel codes are used for the stream.

To be clear, in some embodiments, the demodulation circuits 70 are not configured for JD processing, and each one therefore demodulates a respective one of the data streams 34 selected from the first data streams 34 for demodulation during any given TRX iteration. In one or more other embodiments, each demodulation circuit 70 is configured to perform intra-stream JD processing. Here, each demodulation circuit 70 demodulates a respective one of the data streams 34 selected for demodulation in the given TRX iteration, but it uses joint detection processing to jointly demodulate the substreams comprising the data stream 34, taken two at a time, three at a time, or taken in some other multiple, with the net result that all substreams are demodulated to form the soft information 72 output from the demodulation circuit 70 as a corresponding demodulated data stream.

In yet another embodiment, one or more of the demodulation circuits 70 is configured to perform inter-stream JD processing. With inter-stream JD processing, the demodulation circuit 70 jointly detects two or more substreams, where at least two of the substreams are taken from different ones of the data streams 34. For example, differing pairings or tuples of substreams from two or more data streams 34 may be successively demodulated or demodulated in parallel by a given one of the demodulation circuits 70, such that it outputs demodulated data streams 72 for two or more of the data streams 34.

Of course, various combinations of the above configurations can be used. For example, JD processing in one embodiment can be turned on and off entirely, or switched from intra-stream only to inter-stream only, or to some mix thereof. In a further aspect of control, the number of data streams 34 that are subjected to JD processing in any given TRX iteration can be changed. That is, it may be that JD processing is not used for every one of the second number of data streams 34 selected for demodulation in any given TRX iteration.

In any case, it is recognized herein that, at least under some signal conditions, demodulation performance is improved (at the expense of complexity/higher demodulation resource consumption) by jointly detecting symbols from two or more substreams within any one of the data streams 34 and/or jointly detecting substreams across two or more of the data streams 34.

As a non-limiting example, in FIG. 3B, the branch j demodulation circuit 70 is configured as a JD processor and in the specific example illustrated, it performs joint detection of symbols for substreams across two or more of the data streams 34—i.e., inter-stream JD processing. In this regard, the branch j demodulation circuit 70 can provide demodulation results to its own TDEC circuit 74 and to the TDEC circuits 74 in one or more other branches 46 corresponding to the other data streams 34 involved in the branch j JD processing. Thus, one sees the branch j demodulation circuit 70 feeding TDEC circuits 74 for branches x and y, by way of non-limiting example.

In one embodiment, the demodulation circuit 70 in each branch 46 is configured to demodulate between substreams only within the data stream 34 selected for demodulation by that branch 46. In such an intra-stream embodiment, the demodulation circuit 70 will feed demodulation results—i.e., the soft information 72 representing the corresponding demodulated data stream—to the TDEC circuit 74 in its own branch 46. In another embodiment, the demodulation circuits 70 in one or more of the branches 46—e.g., all of the branches 46—are configured to perform JD processing on substreams from two or more selected ones of the data streams 34.

In an example configuration, a demodulation circuit 70 configured for JD processing will have a set of parallel JD processing blocks, with each block configured to jointly demodulate a pairing of substreams, tuples of substreams, etc. In any case, whether intra-stream JD processing is used for jointly demodulating substreams within one data stream 34, or inter-stream JD processing is used for jointly demodulating substreams taken from two or more data streams 34, the use of JD processing provides another mechanism for trading off complexity/resource consumption versus receiver performance. JD processing may provide particular advantages in, e.g., MIMO OFDM application. In MIMO OFDM, JD processing can be regarded as jointly detecting symbols across spatial multiplexing layers. In CDMA based systems, JD processing may be applied to a received downlink signal wherein parallel codes are reused across transmit antennas.

Of course, as noted, JD processing may be selectively activated, such that JD processing is used in some TRX iterations and not in others, or is used under some signal conditions but not others. Selective activation of JD processing, and selective control of the extent or type of JD processing performed, can be understood as further control mechanisms available for controlling the resource consumption (the consumption of demodulation resources) of the TRX 26 during operation.

Recapping for clarity, the example TRX 26 comprises one or more branches 46, each branch 46 having a demodulation circuit 70 and a corresponding TDEC circuit 74. The TRX 26 is configured to receive a communication signal 36 conveying a first number of data streams 34, and to perform a total number of TRX iterations for the received communication signal 36 within a defined processing time interval.

The defined processing time interval is, for example, a slot, or other interval defined by the transmission timing used for transmitting the communication signal 36. Further, each TRX iteration includes demodulating a second number of the data streams 34 from the received communication signal 36 and Turbo decoding each one of the corresponding demodulated data streams 72 using a number of TDEC iterations.

One or more TRX iterations, e.g., all but the last, include canceling interference in the received communication signal 58. Interference cancellation is performed based on the soft symbol estimates obtained from outcomes of the Turbo decoding and soft symbol mapping. Cancellation may be performed at the end of any given TRX iteration, such that the cancellation affects the next TRX iteration, or cancellation may be performed at the beginning of the given iteration, such that the cancellation affects the current TRX iteration.

Figure 4:
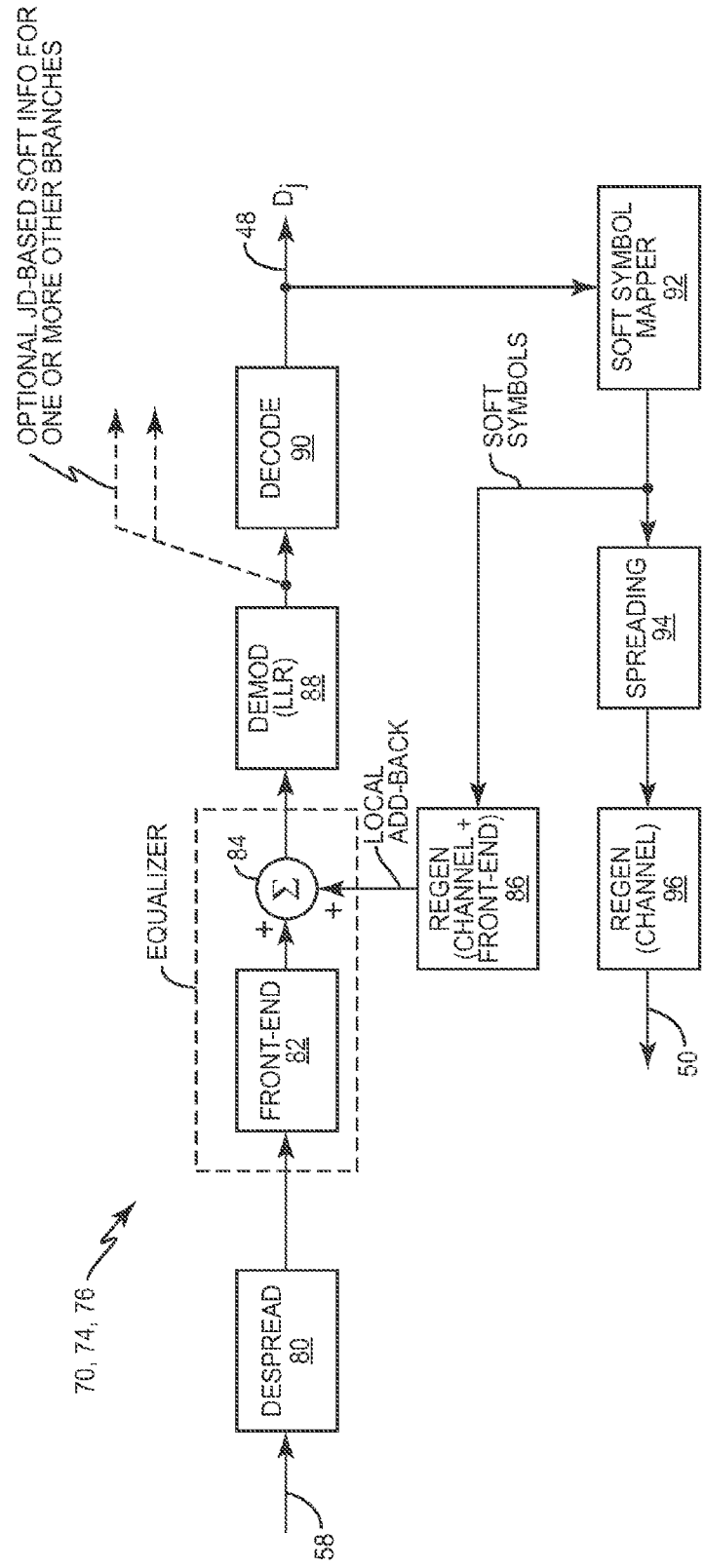
FIG. 4 is a block diagram of further example details in one embodiment of a Turbo receiver branch.

FIG. 4 provides further example details for the demodulation circuit 70, the TDEC circuit 74, and for the soft modulation processing circuit 76 in a given branch 46. At least functionally, these circuits include a despreading circuit 80, an equalization circuit, including front-end 82 and a combiner 84, and further includes a regeneration circuit 86, a demodulation unit 88 (e.g., a Log-Likelihood Ratio or LLR based demodulator), a TDEC unit 90, a soft-symbol mapping circuit 92, a spreading circuit 94 (in CDMA embodiments), and another regeneration circuit 96. For an OFDM or SC-FDMA system a corresponding block to block 94 could be e.g., an (I)FFT processing block.

Note that non-CDMA embodiments would vary from the illustration, e.g., the despreading circuit 80 and spreading circuit 94 would not be included in architectures not targeted to the processing of CDMA signals, but the overall processing will be understood as directly applicable to other, non-CDMA signal types. For example, the despreading circuit 80 and spreading circuit 94 are used for processing CDMA signals, while corresponding processing blocks for OFDM or SC-FDMA signal processing would be Fast Fourier Transform (FFT) and Inverse FFT (IFFT) processing blocks, for example. Of course, that substitution is non-limiting and those skilled in the art will recognize the minor circuit changes needed to configure the signal processing paths for other signal types.

Also note that the regeneration circuit 86 and the combiner 84 cooperate to perform signal add-back in the case of over-cancellation. In this regard, operation of the regeneration circuit 86 should be understood as "scaling operation" applied to the soft symbols output from the soft symbol mapper 92, with the scaling factor determined by channel (h) and weighting coefficients w used in the front-end 82, e.g., the regeneration circuit 86 computes scaling factors as $w^H h$.

Of particular note, the TDEC unit 90 outputs the soft bit values 48, and the soft-symbol mapping circuit 92 maps these to corresponding soft symbol estimates which are regenerated to account for the effects of the transmission channel and the RX front-end circuitry, and the regenerated values are fed to the combining circuit 84, for subtraction from the output of the linear front-end 82. In turn, the linear front-end 82 receives despread values from the despreader 80, as obtained from the received communication signal 36 for the involved data stream 34 in the current TRX iteration.

The same mapped values from the soft-symbol mapping circuit 92, feed a spreading circuit 94, which spreads them as was done for the original transmission. The spread values are regenerated by the regeneration circuit 96 to account for the transmission channel and the regenerated values are output from branch j for the current TRX iteration as the aforementioned estimated contribution signal 50.

Figure 5:
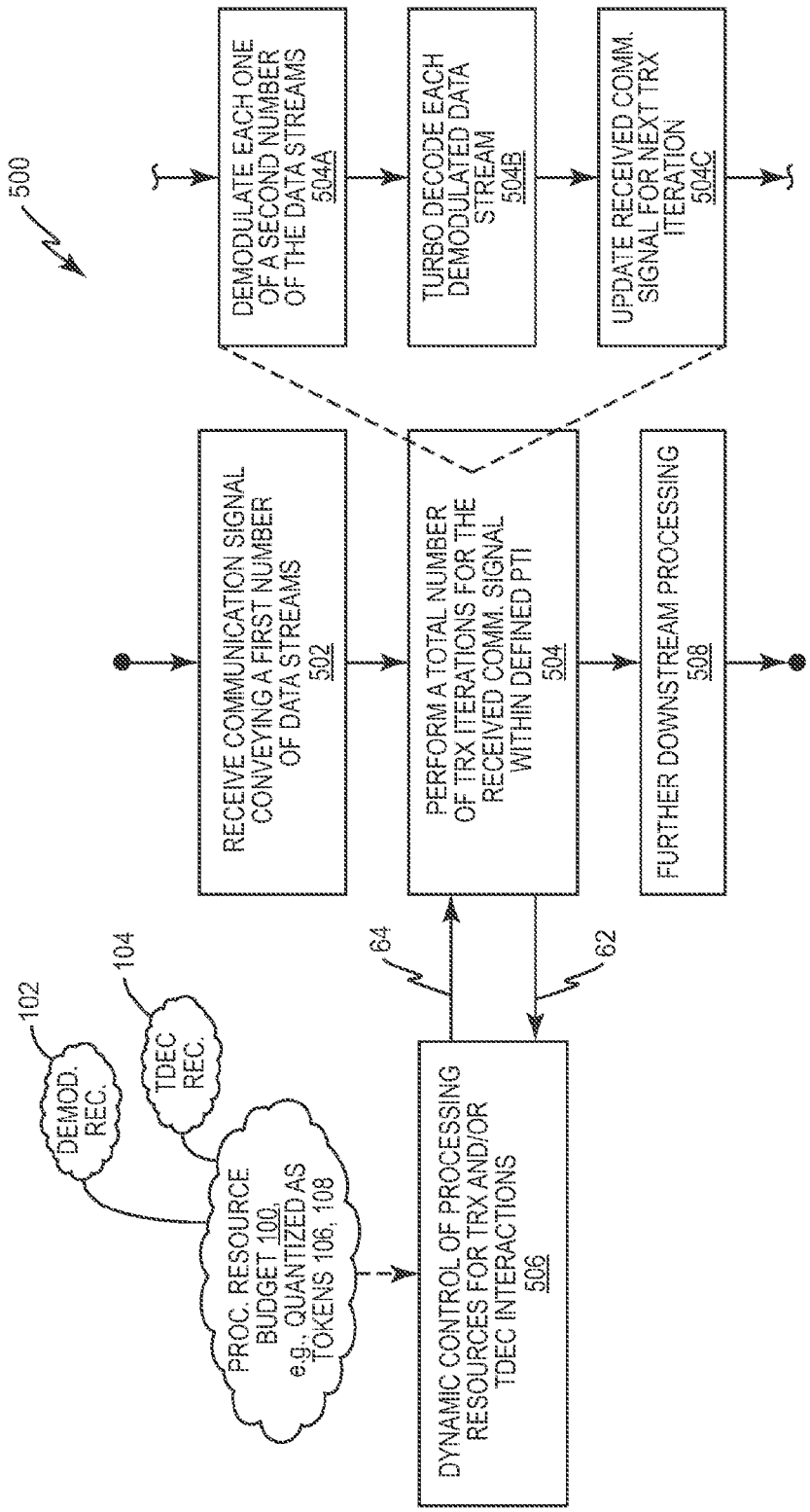
FIG. 5 is a logic flow diagram of one embodiment of a method of resource allocation control processing in a Turbo receiver.

The TRX iterations, and the TDEC iterations within each TRX iteration, consume processing resources and FIG. 5 illustrates an example method 500 directed to controlling the consumption of processing resources by the TRX 26. The method 500 includes receiving (Block 502) the communication signal 36, where the communication signal 36 conveys a first number of data streams 34. Further, the method 500 includes performing (Block 504) a total number of TRX iterations for the received communication signal 36 within a defined processing time interval; dynamically controlling (Block 506) the processing resource consumption of the TRX 26; and performing (Block 508) further downstream processing using the results obtained from the TRX iterations.

The particulars of Block 508 are variable and not germane to understanding the advantageous control of processing resource consumption by the TRX 26, during the processing of Block 504. In understanding such consumption, consider that each TRX iteration includes demodulating a second number of the data streams 34 from the received communication signal 36 and Turbo decoding each one of the corresponding demodulated data streams 72 using a number of Turbo decoding iterations that may be the same or different for different ones of the demodulated data streams 72. The consumption of resources can be indicated to the resource allocation control circuit 28 via the one more control variables 62 (such as coding rates, signal quality metrics, etc.) associated with the processing in Block 504, and controlled using one or more resource allocation control signals 64, which, e.g., control demodulation and/or TDEC complexity dynamically during a defined processing time interval.

In more detail, Block 504 comprises a plurality of related operations, including: demodulating each one of the second number of data streams 34 (Block 504A); turbo decoding each one of the resulting demodulated data streams 72 (Block 504B); and updating the received communication signal 36 for a next TRX iteration (Block 504C). The method is easily altered to perform interference cancellation at the beginning of each TRX iteration—i.e., the received communication signal 36 is updated at the beginning of any given TRX iteration.

Multiple techniques are contemplated for dynamically controlling the processing resource consumption of the TRX 26 within the defined processing time interval (PTI), to increase a likelihood that all data streams 34 that are of interest among the first number of data streams 34 are successfully decoded without exceeding a total processing resource budget 100. In an example embodiment, the total processing resource budget 100 may be represented as demodulation processing resource budget 102, and TDEC processing resource budget 104. Correspondingly, the processing resource budget 100 may be quantized or otherwise "tokenized" as tokens 106 representing the demodulation processing resource budget 102 and tokens 108 representing the TDEC processing resource budget 104. The finite numbers of tokens 106, 108 can be understood as quantizing the processing resources or capacity of the TRX 26, at least as bounded by a defined processing time interval (PTI).

For example, the TDEC processing resource budget 104 of the TRX 26 may be quantized or otherwise represented as $L_{max}$ information bit tokens per PTI. One information bit token may represent processing one information bit in two BCJR forward-backward recursion sets per TDEC iteration, one per constituent encoder (or equivalent). (Here, "BCJR" abbreviates Bahl, Cocke, Jelinek and Raviv, who developed the well-known BCJR algorithm.) While the implementation ignores any second-order overhead effects due to trellis terminations or division of the communication signal transport blocks into code blocks, inclusion of such effects in a practical implementation is straightforward and one or more embodiments of the TRX 26 make such incorporations.

Regardless of how the total processing resource budget 100 is represented, tokenized, or otherwise quantized, example techniques for controlling the processing resource consumption include: varying the total number of TRX iterations; varying the number of TDEC iterations performed for any one or more of the demodulated data streams 72 in each one of any one or more of the TRX iterations; and varying over any two or more of the TRX iterations a set size or set membership with respect to how many and which ones among the first number of data streams 34 are included in the second number of the data streams 34. The resource allocation control circuit 28 may vary any one or more of these parameters, and does not necessarily vary all of them, nor does it necessarily vary the same ones in each TRX iteration. Further examples include turning JD processing on and off and, if JD processing is on, varying the complexity and/or amount of JD processing done in the demodulation phase of each TRX iteration.

In at least one embodiment, dynamically controlling the processing resource consumption of the TRX 26 includes terminating the TRX iterations responsive to successful decoding of the all data streams 34 of interest irrespective of whether the total processing budget 100 has been consumed, and responsive to consuming the total processing resource budget 100 irrespective of whether the all data streams 34 of interest have been successfully decoded. Here, it should be understood that "consumption" of the total processing resource budget 100 is deemed to have occurred when the demodulation processing resource budget 102 is exhausted (as tracked via the consumption of tokens 106), or when the TDEC processing resource budget 104 is exhausted (as tracked via the consumption of tokens 108), or when both demodulation and TDEC processing resource budgets 102, 104 are exhausted.

In the same or other embodiments, dynamically controlling the processing resource consumption of the TRX 26 includes controlling how many TDEC iterations are performed for any one or more of the demodulated data streams 72 in any one or more of the TRX iterations, as a function of at least one of per-data-stream coding rates and per-stream signal qualities. In at least one such embodiment, the TRX 26 is configured to calculate the per-stream signal qualities to reflect one or both of actual signal quality improvements gained in any past TRX iterations, and projected signal quality improvements estimated for one or more future TRX iterations.

In the same or other embodiments, the first number of data streams 34 includes a number M data streams 34 that are of interest—e.g., M data streams 34 that are specifically targeted to the apparatus 10, where M≥1. The first number of data streams 34 further includes a remaining number T of interfering data streams 34—e.g., these streams 34 may be targeted to other wireless devices but act as interferers with respect to the data streams 34 that are of interest. Further, the TRX 26 includes at least J receiver branches 46, each such receiver branch 46 providing soft demodulation and Turbo decoding for each one of up to J data streams 34 in each TRX iteration.

The number J of branches 46 may exceed the first number of data streams 34, or at least may exceed the number M of them that is of interest. Thus, in each TRX iteration, up to J data streams 34 are selected as the second number of data streams 34 that are demodulated and Turbo decoded in the current TRX iteration. As noted, the number of streams 34 selected in each TRX iteration may vary, and the particular streams 34 selected also may vary. That is, the membership in the second number of streams 34 may change between TRX iterations. Such operations reflect the advantageous recognition that certain streams 34 are more advantageous to process in certain TRX iterations. For example, the signal quality of some streams 34 may be too low in one or more of the initial TRX iterations, but may improve with successive interference cancellation. Conversely, one or more interfering data streams 34 may be so strong that convergence of the TRX 26 toward an overall successful decoding outcome may be quickened by selecting and canceling the strongest interferers earliest in the total number of TRX iterations.

As a further elaboration on the contemplated "intelligent" or "smart" allocation of processing resources where and when they provide the most value, it is contemplated herein that the first number of data streams 34 is managed as an addressable set, so that the second number of data streams 34 can be varied in both number and set membership. In a non-limiting example approach, the TRX 26 starts TRX processing based on selecting one or more of its "own" data streams 34 from a serving cell in a wireless communication network to which the apparatus 10 is communicatively connected, along with one data stream 34 from a neighboring cell in the network. This starting set of data streams 34 may be changed to add or substitute another data stream 34 from an additional neighbor cell, once the initial TRX iterations have cleaned up the received communication signal 36 sufficiently for the apparatus 10 to accurately obtain the control channel of the additional neighbor cell. The thus obtained control information allows for demodulation and Turbo decoding of the additional data stream.

Thus, in at least one embodiment of the method 500, the resource allocation control circuit 28 is configured to vary which ones and how many of the M data streams (34) of interest are included in the second number of data streams 34 in any given one or more of the TRX iterations and/or to vary which ones and how many of the T interfering data streams 34 are selected for inclusion in the second number of data streams (34) in any given one or more of the TRX iterations.

In an example embodiment, any given TRX iteration comprises: demodulating each one of the second number of data streams 34 from the updated received communication signal 36 in a corresponding receiver branch 46; estimating a average soft value magnitude for each demodulated data signal 72 as a signal quality metric for the demodulated data signal 72; calculating per-branch processing resource allocations for Turbo decoding the demodulated data streams 72 in their corresponding receiver branches 46 by evaluating an allocation function that depends on the signal quality metrics and a remaining processing resource budget; Turbo decoding each of the demodulated data streams 72 according to the per-branch processing resource allocations calculated for Turbo decoding; mapping soft bit values 48 produced from the Turbo decoding in each receiver branch 46 to corresponding soft symbol estimates and combining the soft symbol estimates with the updated received signal 36 to obtain the updated received signal 36 (i.e., signal 58) for use in the next TRX iteration; and updating the accumulated processing resource consumption to reflect the processing resources used in the current iteration.

Note that in an alternative embodiment contemplated herein, the TRX 26 implements a form of joint demodulation where the output from the Turbo decoding circuit 74 is in the form of a priori probabilities for the coded bits in the received symbols. Also note that the remaining processing resource budget mentioned above is determined as a difference between the total processing resource budget 100 and an accumulated processing resource consumption, as accumulated over any prior TRX iterations.

In an example configuration, an equal and constant amount of processing resources is allocated to each Turbo decoding iteration in each receiver branch 46. Therefore, the resource allocation control circuit 28 controls the processing resource consumption of the TRX 26 by controlling the total number of TRX iterations, in combination with controlling the number of Turbo decoding iterations (e.g., per branch 46) performed in each such TRX iteration.

In another example case, the processing resource consumption of the TRX 26 is controlled based on the resource allocation control circuit 28 being configured to control the number of Turbo decoding iterations performed on each of the demodulated data streams 72 (in each of one or more TRX iterations) according to a resource allocation function that considers signal qualities of the demodulated data streams 72.

Those demodulated data streams 72 having signal qualities within their respective target quality range, as determined by their coding rates, are allocated, or are at least biased towards being allocated, a higher number of Turbo decoding iterations, as compared to those demodulated data streams 72 having signal qualities above or below the target quality range.

Essentially, the demodulated data streams "having signal qualities within the respective target quality range" means that the signal quality is in the vicinity of the quality value required for successful decoding. Here, the span of the useful "vicinity" region depends at least on the coding rate.

Additionally, the phrase "at least being biased towards being allocated" means that there is a "preference" to allocate in this manner, with increased probability. However, it is not certain that such allocation always is the case. The actual allocation can be based on parameters/quality measures that do not lead to such allocation every time—that is, the actual allocation may deviate depending on other variables or considerations. However, the biasing means that, on average, the allocation more likely happen than not.

This arrangement reflects the advantageous recognition that there is a "sweet spot" regarding signal quality and the need for greater investments of finite processing resources. That is, data streams 34 having a signal quality below the target quality range generally do not represent a valuable investment of processing resources and, conversely, data streams 34 having a signal quality above the target quality range generally can be successfully processed with lower investments of processing resources. In contrast, those data streams 34 whose signal qualities are within the target quality range are much more likely to contribute attractive added value to the TRX processing at the given TRX iteration with moderate extra resources expended—e.g., additional TDEC iterations, more complex demodulation, etc.

In the same or other embodiments, controlling the processing resource consumption of the TRX 26 comprises controlling the number of Turbo decoding iterations performed on each of the demodulated data streams 72 according to a resource allocation function that considers coding rates of the demodulated data streams 72. Those demodulated data streams 72 having coding rates below an threshold are allocated, or are at least biased towards being allocated, a higher number of Turbo decoding iterations as compared to those demodulated data streams 72 having coding rates above the threshold. The threshold(s) used here may be predetermined values, e.g., values obtained from offline simulations or otherwise provisioned as configuration values.

In another embodiment, controlling the processing resource consumption of the TRX 26 comprises controlling the number of Turbo decoding iterations performed on each of the demodulated data streams 72 according to a resource allocation function that considers a progression of the TRX iterations. The demodulated data streams 72 are allocated, or are at least biased towards being allocated, a lower number of Turbo decoding iterations during an initial TRX iteration, or during one or more of the earliest TRX iterations, and then are allocated, or are at least biased towards being allocated, a higher number of Turbo decoding iterations during a last TRX iteration, or during one or more of the subsequent TRX iterations.

In the same or other embodiments, dynamically controlling the processing resource consumption of the TRX 26 further comprises varying an allocation of demodulator circuit resources used over two or more of the TRX iterations, to further increase the likelihood that the data streams 34 of interest among the first number of data streams 34 are successfully decoded without exceeding the total processing resource budget 100. "Varying" over two or more iterations simply means that the allocations between two or more iterations vary.

In appreciating the various aspects of the example resource allocation controls described above, consider that the processing blocks with the highest aggregate computational load in Turbo receiver processing often are those associated with the TDEC operations. In an example case, the total TDEC load is proportional to the total number of users/MIMO streams, the total number of TRX iterations, the number of TDEC iterations per stream and per TRX iteration, and the transport block length. For large transport block sizes, handling the total decoding load becomes a challenging task and drives up hardware costs.

In some scenarios, the equalization and demodulation load per stream and TRX iteration may also be significant. The aggregate equalization load is again proportional to the number of data streams 34 and TRX iterations.

The resource allocation control circuit 28 thus can be understood as reducing the total processing complexity needed to achieve a given receiver performance, based on providing dynamic and optionally adaptive receiver hardware dimensioning during live operation. In more detail, the methods and apparatuses disclosed herein exploit the insight that the instantaneous relative contributions of the per-branch demodulation, IC, and TDEC stages in converging towards a successful decoding outcome in a Turbo receiver depend heavily on the reception scenario (per-branch code rate, etc.) and the per-branch signal quality at the current TRX iteration. These parameters are thus used in some embodiments of the contemplated TRX 26 to flexibly configure the receiver to provide best possible performance within the bounds of the total processing capability of the TRX 26—i.e., within the total processing resource budget 100, which, in an example definition, denotes the amount and/or type of processing operations that can be performed within a defined processing time interval, such as applies in the real-time demodulation and decoding of a communication signal.

In at least one embodiment, the TRX 26 implements a receiver structure where the per-branch TDEC iteration allocation is updated dynamically at each TRX iteration, based on the actual and target signal qualities for the per-branch signals. The optimal resource allocation may be determined by a tree search (detailed later) where the present signal quality metrics for all branches 46 are mapped to future signal quality metrics as a function of a given candidate TDEC resource distribution.

Returning to the Turbo receiver architecture introduced in FIGS. 2-4, consider the j-th branch 46 out of J such branches 46. Denote its transport block length by $L^{(j)}$ bits and the resulting effective coding rate by $R^{(j)}$. At TRX iteration k out of a total of $N_{TRX}$ iterations of the TRX 26, let the TDEC circuit 74 of branch j perform $N_{TDEC,k}^{(j)}$ decoding iterations. The total TDEC capability—i.e., the total TDEC processing resource budget 104 of the TRX 26—may be represented as $L_{max}$ information bit tokens per PTI.

For dynamic per-TRX-iteration allocation updates, as done in one or more embodiments, the resource allocation control circuit 28 updates the TDEC resource allocation among the individual branches 46 as the TRX iterations progress. The total number of TRX iterations is not pre-defined, but instead is worked out dynamically for each transport block of the "own user," where that phrase indicates that one data stream 34 is the "own" or targeted data stream 34 for the apparatus 10. Thus, the TRX 26 may process the different transport blocks of that own-data stream 34 different total numbers of TRX iterations.

Consider an update at the k-th TRX iteration. Because of channel quality reporting errors, channel variability, interference conditions, etc., the scheduled rates for the individual branches $R^{(j)}$ in general do not concur exactly with the current respective received signal qualities. Thus, the set of coding rates does not constitute a sufficient statistic for instantaneously optimal TDEC resource allocation, and per-branch signal quality metrics $Q^{(j)}$ may be used as additional input to the allocation processes implemented by the resource allocation control circuit 28. The value of $Q^{(j)}$ may be, for example, the input signal SINR (effective geometry), equalized symbol SINR, cancellation efficiency after the previous iteration, mean soft value magnitude after demodulation, etc.

Note that the post-equalization SINR—i.e., signal quality—is a function of the average soft value magnitude, and thus of the cancellation efficiency, in the previous TRX iteration. Therefore, the TRX 26 can use a so-defined target cancellation efficiency and then monitor the actual cancellation efficiency on-the-fly to determine how close it is to finishing. For example, if there is a large gap between actual and target, then the resource allocation control circuit 28 can allocate fewer TDEC iterations. Also, the signal quality metrics $Q_k^{(j)}$ are preferably updated to capture the improvements from the previous k−1 TRX iterations, estimated, for example, at the output of the j-th demodulation circuit 70 prior to launching the k-th TDEC iteration set in branch j.

The resource allocation parameters for the next allocation update window length W≥1 TRX iterations are then obtained from a resource allocation function $F_{dyn}$ $$\lfloor\{N_{TDEC,l}\}_{j;l=k}^{k+W-1}\rfloor = F_{\text{dyn}}(\{R^{(j)}\}, \{Q_k^{(j)}\} \mid L_{max} - L_{k-1}), \quad (1)$$

where $L_{max}-L_{k-1}$ the remaining TDEC token budget and $N_{TDEC,k}^{(j)}$ is the per-branch j TDEC resource (iteration) allocation for the TRX iteration k. The notation $\{*\}_j$ indicates a set of iteration values* over some range of index values j.

At the k-th TRX iteration, the allocation is subject to a total resource constraint $L_{max}-L_{k-1}$, where the TDEC resources already consumed by previous TRX iterations $L_{k-1}$ are subtracted from the initial available budget $L_{max}$:

$$\sum_{l=k}^{N_{TRX,k}} \sum_{j=1}^{J} N_{TDEC,l}^{(j)} L^{(j)} \leq L_{max} - L_{k-1}; \quad (2)$$

$$L_{k-1} = \sum_{l=1}^{k-1} \sum_{j=1}^{J} N_{TDEC,l}^{(j)} L^{(j)}. \quad (3)$$

The $L^{(j)}$ term denotes the number of TDEC iterations needed or used in the j-th branch 46 in a given TRX iteration, and the quantity $N_{TRX,k}$ reflects the total projected number of TRX iterations at iteration k, but that projection may not be explicitly derived and/or it may be changed at a subsequent iteration.

The dynamic allocation update process is terminated when all signals of interest are successfully decoded or when the TDEC tokens are used up.

The approach works well also when additional TRX branches 46 are added in subsequent iterations, e.g. when initially unintelligible interfering data streams 34 can be resolved because of interference reductions in the received communication signal 36. Here, "additional" branches 46 are available in reserve, such as when there are fewer data streams 34 selected for demodulation and Turbo decoding in one or more of the earliest TRX iterations than there are available branches 46.

As a further aspect of such processing, the choice of the allocation update window length W is an implementation-specific design parameter. In one embodiment, resource allocation for all TRX iterations is done in advance, $W=N_{TRX}$, prior to initiating the TRX iteration process, $$\lfloor\{N_{TDEC,l}\}_{j;l=k}^{N_{TRX}}\rfloor = F_2(\{R^{(j)}\}, \{Q^{(j)}\} \mid \{L^{(j)}\}, L_{max}), \quad (4)$$

subject to $$\sum_{l=1}^{N_{TRX}} \sum_{j=1}^{J} N_{TDEC,l}^{(j)} L^{(j)} \leq L_{max}. \quad (5)$$

Figure 6:
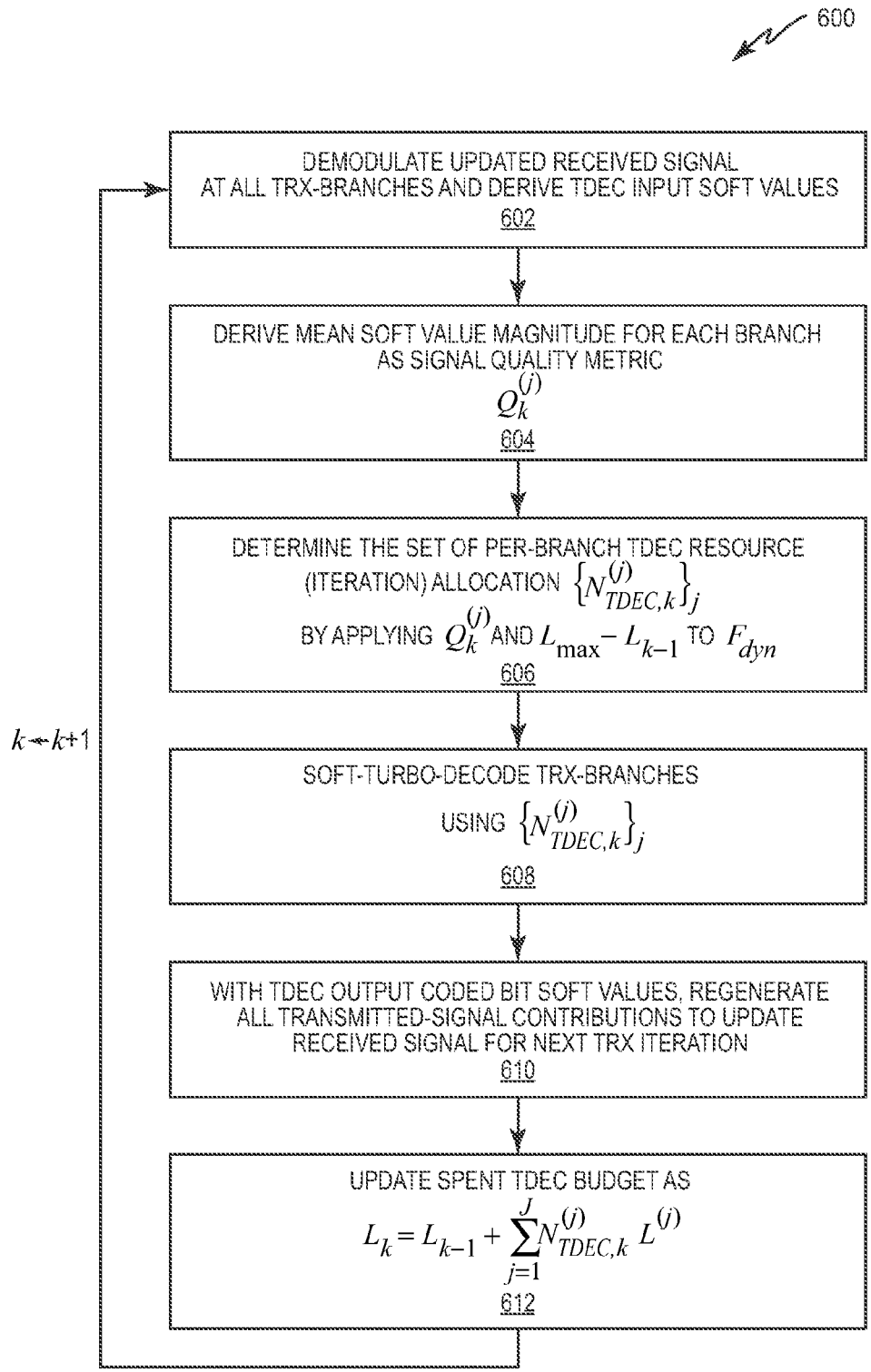
FIG. 6 is logic flow diagram of further example processing details, such as may be included in the method introduced in FIG. 5.

Each branch 46 operates on one independently Turbo-encoded data stream 34 (code-word, MIMO stream, etc.), being either a data stream 34 of interest that is targeted to the apparatus 10 or an interfering data stream 34 targeted to another user. Let the first M TRX-branches 46 out of J belong to the own user whose performance should be maximized. Now, according to the method 600 illustrated in FIG. 6, at TRX iteration k, the updated received communication signal 36 is demodulated at all TRX-branches 46 (including branch-specific add-back) to obtain the TDEC input soft values (Block 602). (Note that method 600 is a more detailed example embodiment of the method 500.)

Processing continues with the estimation of the mean soft value magnitude for each branch 46, which is estimated as the signal quality metric $Q_k^{(j)}$ (Block 604). The metric values $Q_k^{(j)}$, together with the remaining TDEC token budget $L_{max}-L_{k-1}$, are used as input to the function $F_{dyn}$ to obtain the set of per-branch TDEC resource (iteration) allocation $\{N_{TDEC,k}^{(j)}\}_j$ (Block 606).

All TRX-branches 46 are soft-Turbo-decoded using the determined allocation (Block 608). At each branch 46, the TDEC output coded soft bit values 48 are mapped to soft symbol estimates, which are used to regenerate the relevant transmitted signal contribution—i.e., to generate the estimated contribution signals 50 (Block 610). In this example, these contributions are summed and subtracted from the received communication signal 36 to update the received communication signal 36 for the next TRX iteration.

The spent TDEC budget is updated by accounting for the information bit tokens spent in the current TRX iteration, $$L_k = L_{k-1} + \sum_{j=1}^{J} N_{TDEC,k}^{(j)} L^{(j)}$$

(Block 612) and the process repeats until the first M branches 46 are successfully decoded (e.g., as indicated by the CRCs checking as "OK") or until the TDEC token budget is depleted.

Figure 7:
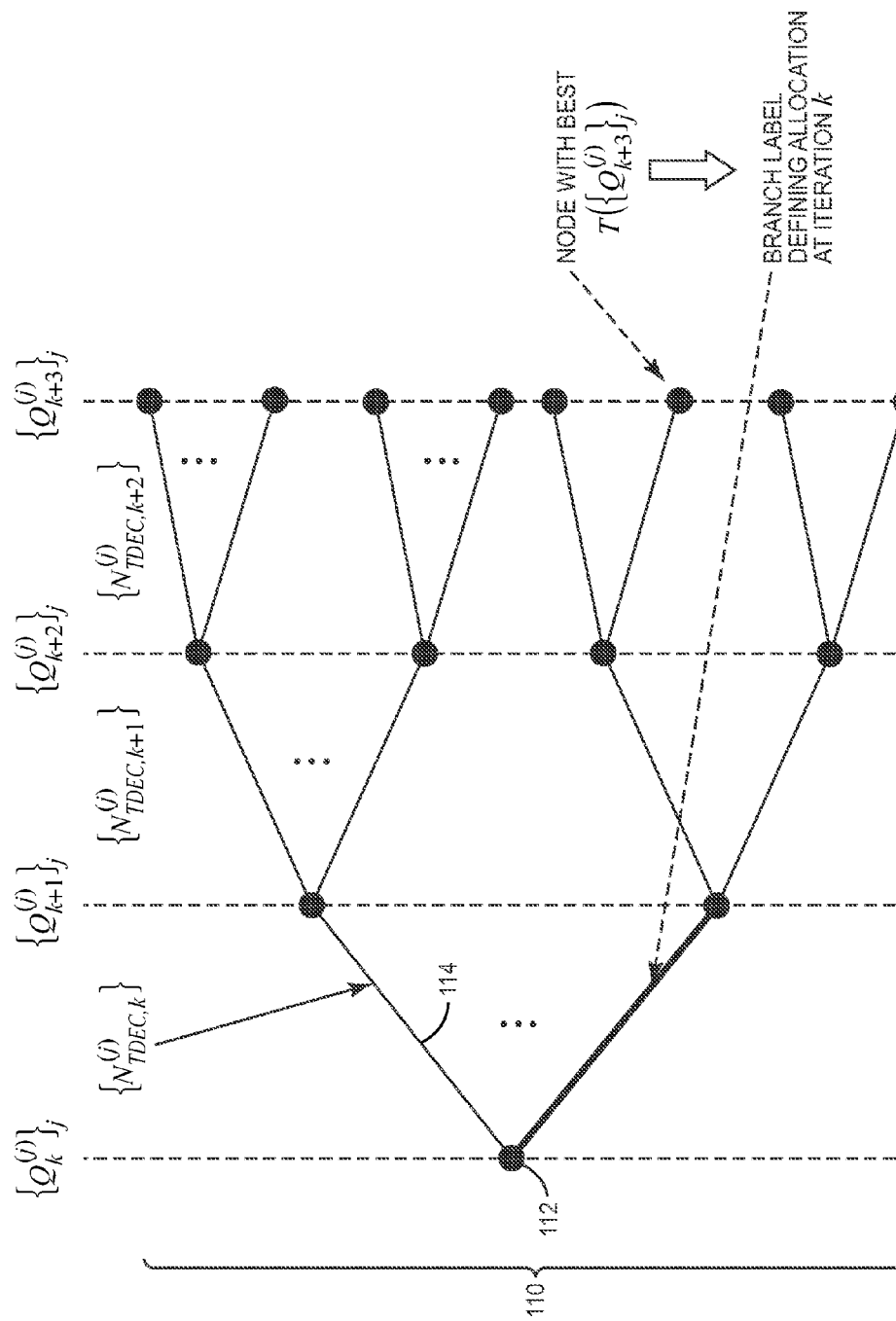
FIG. 7 is a diagram of a tree structure in one embodiment of a Turbo receiver that uses a tree search to better optimize resource allocation for Turbo receiver processing.

The resource allocation function $F_{dyn}$ may, in some embodiments, be represented by a tree structure, such as the tree structure 110 depicted in FIG. 7. Each node 112 in the tree structure 110 represents the set of signal quality metrics for the J branches 46. Each tree branch 114 (not to be confused with the receiver branches 46) is labeled with a candidate TDEC token (or iteration) distribution among the (receiver) branches 46, and represents a mapping function G of the set of per-TRX-branch signal quality metrics at the current TRX iteration to the same at the next iteration.

Finding the preferred TDEC resource allocation then amounts to performing a tree search of depth D to find the node 112 with best aggregate performance measure T over receiver branches 1 . . . M, or the node 112 at the minimum depth fulfilling the target quality requirements. The TDEC resource distribution for the current iteration is obtained from the label associated with the first tree-branch 114 in the path to that node 112. The tree search may be executed brute-force or according to known tree searching algorithms.

The mapping function $\{Q_{k+1}^{(j)}\}_j = H(\{Q_{TDEC,k}^{(j)}\}_j)$ may be evaluated as follows:

1. estimate per-TRX-branch TDEC output soft-value quality as function of the current TDEC input soft value quality for the given TDEC iterations, e.g. using EXIT (Extrinsic information transfer chart) techniques (see, e.g., T. Richardson and R. Urbanke: "Modern Coding Theory", Cambridge University Press, Edition 1, 2008) or comparing $Q_k^{(j)}$ to predetermined nominal signal quality $Q_{nom}(R^{(j)})$;
2. estimate average soft value magnitude estimates and resulting cancellation efficiencies;
3. estimate per-branch remaining interfering signal power after IC at next TRX iteration;
4. estimate and report per-branch demodulator output signal quality at next TRX iteration.

Steps 1 and 2 may be accomplished using a single look-up table, parameterized by $Q_k^{(j)}$, $R^{(j)}$, and the candidate $N_{TDEC,k}^{(j)}$. Steps 3 and 4 may be effected by parametrically predicting demodulator output SINR, e.g. by modifying the impairment covariance estimate using the current average soft value magnitude.

The aggregate performance measure $T(\{Q_k^{(j)}\}_j)$ may be the "worst" value among per-branch performance measures for the first M branches 46, where the per-branch performance measure is a function of the per-branch signal quality metric, and may be, for example, BLER, "actual-to-target signal quality gap", or average soft value magnitude. An alternative performance measure is the presence of at least one branch 46 with average soft value magnitude >x where x is close to one ("1"). Here it is assumed that the soft symbols are generated according modulation constellation having unit average amplitude.

The depth of the search tree—i.e., the look-ahead depth D, which is different than the earlier described update window length W—is a design parameter. The depth D depends on, for example, the complexity constraints at hand and the available parameter estimation quality. Of course, there is a complexity-performance tradeoff to consider, as the depth D affects the reliability of the future soft value quality predictions. Generally, a look-ahead incorporating more than one TRX iteration is desirable.

Additional combinations and/or subsets of the performance criteria, signal quality metrics, and scheduling of the described features may be utilized by related embodiments without deviating from the basic processing approach outlined above, as may supersets including additional implementation-specific aspects.

Another example embodiment formulates the dynamic allocation scheme without using a tree search. The TDEC resources at a given TRX iteration may be distributed so as to achieve maximum possible soft value quality improvement for all TRX branches 46. This embodiment is well motivated for the PIC-with-add-back architecture of FIGS. 2 and 3, with particular details in FIG. 4, because each branch's soft value improvement over TRX iterations accumulates in the post-TDEC soft symbol estimates—subsequent TRX iterations always start at least from the quality level where the previous iteration finished.

The TDEC token allocation for branch j at iteration k, $N_{TDEC,k}^{(j)}$ is thus determined based on the actual signal quality metric $Q_k^{(j)}$ for the branch. The EXIT chart for the relevant transport format ($R^{(j)}$, etc.) and effective SINR is used to determine the available soft value improvement and the number of iterations required to achieve it. The number of iterations to allocate is then selected as a trade-off considering the marginal improvement for each additional TDEC iteration. One tactic harvests the "easy gains" at each TRX iteration. This is done by limiting the number of TDEC iterations in any given TRX iteration to a level where the marginal soft value improvement returns are above a pre-determined threshold, but not larger.

This embodiment has the advantage of not requiring joint resource allocation over branches 46 or searches over several iterations, at the cost of some potential computational efficiency loss (the same soft value improvement may be available at a subsequent TRX iteration for a lower TDEC iteration cost).

The use of a constant per-branch allocation is considered among the various simplified embodiments detailed herein. That is, in one or more "non-dynamic" allocation embodiments, the TDEC resource allocation over the TRX branches 46 is constant for all TRX iterations, but the $N_{TDEC}$ parameter is adapted responsive to the code rates of the individual branches 46. The constraint then becomes $$N_{TRX} \sum_{j=1}^{J} N_{TDEC}^{(j)} L^{(j)} \le L_{max} \qquad (6)$$

and the resource allocation function assumes the form $$[\{N_{TDEC}^{(j)}\}_j, N_{TRX}] = F_1(\{R^{(j)}\}, \{Q^{(j)}\} | L_{max}), \qquad (7)$$

Another simplified embodiment uses equal constant per-branch allocation. Here, all TRX branches 46 may be allocated equal TDEC resources. The total TDEC token budget then governs the feasible combinations of parameter values $N_{TRX}$ and $N_{TDEC}$, subject to the constraint $$N_{TDEC} N_{TRX} \sum_{j=1}^{J} L^{(j)} \le L_{max} \qquad (8)$$

and the lookup function takes the form $$[N_{TDEC}, N_{TRX}] = F_0(\{R^{(j)}\}, \{Q^{(j)}\} | L_{max}). \qquad (9)$$

Such an embodiment may be desirable e.g. for determining a favorable $N_{TDEC}/N_{TRX}$ trade-off—i.e., a ratio between TDEC iterations versus TRX iterations leading to the best possible TRX performance—when the TRX 26 is primarily used for mitigating dispersive channel effects and a single TRX branch 46 is invoked.

When considering performance criteria for optimal TDEC iteration allocation, it is recognized herein that the relationship between the actual signal quality for a given branch 46 and the "nominal" (target) signal quality for the chosen code rate allows estimating the degree of soft value improvement possible via TDEC, and the number of TDEC iterations usefully expended.

EXIT charts produced for different input soft bit quality levels and code block formats may be used to estimate the available improvement in each case by observing the point where the channel closes or narrows significantly. Additionally, or alternatively, certain rules-of-thumb may be applied by the TRX 26 for given $Q_k^{(j)}$ and $Q_{nom}(R^{(j)})$:

$Q_k^{(j)}$ much lower than $Q_{nom}$ ($R^{(j)}$): limited improvement available, usually achieved by few TDEC iterations.
  Fewer TDEC iterations utilized in early TRX iterations when many branches are likely to exhibit lower-than-nominal signal quality
  When no further resources are available (e.g. at the last TRX IC stage), no TDEC resources are wasted on branches whose successful decoding is unlikely $Q_k^{(j)}$ approximately equals $Q_{nom}$ ($R^{(j)}$): the obtained improvement grows along with the allocated number of iterations
  More TDEC iterations are beneficial in subsequent TRX iterations $Q_k^{(j)}$ significantly exceeds $Q_{nom}$ ($R^{(j)}$): full decoding or significant soft bit quality improvement possible
  few iterations are needed Some additional trade-offs that can be used by the TRX 26 when determining the allocations:
  TDEC is instrumental for IC at low symbol SINR/low code rates, but does not contribute very much at high code rates (it does nothing with uncoded blocks) and the largest code blocks may be encountered at the highest code rates:
    low R: may need many TRX iterations, but TRX 26 can still fit sufficient TDEC iterations in each such iteration (due to smaller blocks)

medium-high R: few TRX iterations suffice, so TRX 26 can still fit sufficient TDEC iterations in each such iteration (despite larger blocks)

highest R: few TRX iterations and few TDEC iterations suffice since the signal quality was probably good to begin with In initial TRX iterations, the gains from IC are the most significant initial iterations: fewer TDEC iterations (perhaps none for the highest R)

subsequent (or last) iterations: more (or full) TDEC iterations.

In another enhancement incorporated in some embodiments, the $F_1$ function is obtained via lookup table. The lookup function may be realized via a pre-computed lookup table. It is prepared, for example, off-line by simulating numerous candidate configurations to determine the configurations with the best performance. The size of the lookup table may be limited by applying certain simplifications. For example, the rate and signal quality parameters may be coarsely quantized, because the optimal allocation is not expected to be very sensitive to minor variations in these parameters. Further, the per-branch block length parameters may be normalized with respect to $L_{max}$, because, with the exception of extremely short block lengths (which may be ignored), only the inter-branch fractional block length differences are relevant in the look-up phase.

To further limit the size of the lookup table when obtaining the $F_{dyn}$ values, a practical implementation might use $F_1$ to obtain the per-branch TDEC budget and perform the per-TRX-iteration TDEC iteration assignment on a per-branch basis. Of course, the design of the lookup functions are implementation-dependent and should capture the demodulator performance features (linear or joint-detection), etc.

In another alternative, the $F_i$ functions are implemented on-line, i.e., on the fly. Here, the potentially elaborate resource allocation lookup function output is emulated "live". The overall multi-dimensional look-up task may be successively broken into multiple lower-dimensional tasks that are finally solved by simple one- or two-dimensional lookup operations for the individual parameters, as illustrated by the example embodiment above.

The look-up tables may be adapted on-line to improve their match for the current receiver implementation and/or reception conditions. In one embodiment, the TRX 26 initially uses the pre-computed functions for resource allocation decisions, but simultaneously records the practically observed performance for the actually encountered input parameters and allocation choices. Using these statistics, the resource allocation functions are adaptively modified by the resource allocation control circuit 28, to provide increasingly efficient resource allocation decisions for the conditions at hand. In one embodiment, the simple look-up functions may be determined entirely on-line, applying self-learning and successively tuning the TRX performance to the practically observed system characteristics.

Of course, in addition to the TDEC resource controls, demodulation may also be a compute-intensive processing stage that limits the permissible number of TRX iterations. Principles similar to those described above may be used to determine the optimal resource partitioning in view of demodulation operations:

$$\sum_{l=1}^{N_{TRX}} \sum_{j=1}^{J} X_l^{(j)} \leq X_{max}, \quad (10)$$

where the $X_l^{(j)}$ are computational resources expended by the j-th branch at the l-th TRX iteration and $X_{max}$ is the total budget. The overall optimization problem in this case becomes $$[\{Y_l^{(j)}\}, N_{TRX}] = F_3(\{Z^{(j)}\}, \{Q^{(j)}\} | X_{max}). \quad (11)$$

Some of the parameters $Y_l^{(j)}$ that may be used to control the total demodulation processing complexity are the number of equalizer taps/fingers, number of iterations in matrix inversions/decompositions, the "m" parameter in the m-algorithm, the choice of estimation algorithms, etc. The $Z^{(j)}$ may contain signal configuration parameters (MIMO modes, number of HSPA codes or LTE resource blocks) and $Q^{(j)}$ are equalizer/demodulator input signal quality metrics (geometry, SINR, dispersion, Doppler, etc.).

Additionally, another control parameter related to resource consumption is related to the selective activation and/or configuration of JD processing in branches 46. Such control will be understood as relating to the consumption of demodulation processing resource budget 102 from the total processing resource budget 100. Example JD controls include: (1) activating or deactivating the use of JD processing for all or some of the data streams 34 selected for demodulation in any TRX iteration; (2) configuring JD processing for intra-stream or inter-stream processing; and (3) the number of substreams per JD block and thus number of JD blocks active within each of the demodulation circuits 70 that are performing JD processing.

One approach to controlling the use and/or complexity of JD processing, as part of controlling the consumption of demodulation processing resource budget 102, considers post-decoding IC. In an example configuration of such control, the resource allocation control circuit 28 flexibly allocates in each of one or more of the branches 46 the number of substreams that are jointly detected (as a group) by the demodulation circuit 70 of that branch 46. For example, pairs of substreams may be jointly demodulated in the simplest configuration, tuples of substreams in a more complex configuration, and even larger groups at the further expense of complexity. As noted before, the size of the JD groups determines the number of JD processing blocks needed in each demodulation circuit 70 that is performing JD processing. Larger JD group sizes results in fewer JD processing blocks but increased JD processing complexity. Therefore, larger JD group sizes with more substreams being jointly demodulated in each JD processing block consume more of the demodulation processing resource budget 102 than smaller JD group sizes.

In an extreme case, all substreams being demodulated by a given demodulation circuit 70 in a given branch 46 are jointly demodulated as one group—i.e., there is only one JD processing block and it handles all of the substreams. In the other extreme, which effectively is no joint detection at all, there are as many single detection (SD) processing blocks as there are substreams being demodulated in the given demodulation circuit 70. With this approach, the TRX 26 can advantageously be used for downlink MIMO, which creates substreams using a number of parallel codes (HSPA) or layers (LTE) per MIMO data stream, 34. Similarly, the TRX 26 can be used for the uplink case, which uses a number of parallel codes (WCDMA) per user, to create substreams within the data stream 34 received from each user. (Similar processing applies in the LTE case, with spatial multiplexing layers.)

Thus, the TRX 26 can adjust its use and consumption of demodulation processing resources 102 from the total processing resource budget 100 by deciding:
- whether to use no JD or full-on JD (joint detection of all substreams);
- configuring the JD complexity—more JD processing blocks in each given demodulation circuit 70 with a smaller number of substreams jointly processed in each JD processing block reduces JD processing complexity but tends to lower the gains offered by JD processing, while fewer JD processing blocks in each given demodulation circuit 70 jointly processing larger groups of substreams or one JD processing block handling all substreams of interest for a given branch yields "better" or "richer" joint detection performance at the expense of potentially much more complex JD processing;
- configuring the size of the JD "search space" used for jointly detecting the substreams handled in each JD processing block within a given demodulation circuit 70; e.g., if the number of substreams being handled by the JD processing block is small, say, two or three substreams, the full search space (e.g., all possible combinations of all candidate symbols) may be used, or reduced search spaces may be used (e.g., only the N most likely candidate symbol combinations) when each JD processing block within a given demodulation circuit 70 handles a larger number of substreams—such control can be achieved by adjusting the "m" parameter in the m-algorithm (where M=1 equals no JD at all), by adjusting the radius used in spherical decoding, etc.

Additional non-limiting examples of adapting demodulation parameters to control the consumption of demodulation processing resources 102 include these items: equalizer tap/finger allocation are increased for more dispersive propagation channels or residual ISI, or early iterations; iterative matrix inversion/decomposition operations are allocated more resources when the signal quality is high; the m parameter is increased for low-quality signals or early iterations.

In more detail, consider an example case of allocating and managing the consumption of demodulation processing resources 102 across a number of TRX iterations and as one aspect of the resource allocation control circuit 28 controlling the consumption of processing resources from the total processing resource budget 100. First, consider allocation in the case where JD processing is not used—i.e., no intra-stream or inter-stream joint detection of substreams within the data streams 34:
- compute post equalization (demodulation) SINR for each data stream 34 among the second number of data streams 34 selected for demodulation for a given TRX iteration—these values will reflect interference cancellation that has occurred prior to demodulation;
- compare per-stream post demodulation SINR to the SINR required to successfully decode the data stream 34 in question—i.e., the SINR needed to decode the corresponding demodulated data stream 72; the required SINR is a function of the modulation (QPSK, 16QAM, etc.) and the code rate and the required SINRs for each MCS (modulation and coding scheme) are known a priori, and may be tabulated or otherwise stored in the TRX 26;
- if the post equalization SINR for a particular data stream 34 is close to the required SINR then it is advantageous to allocate proportionately more demodulation resources to that data stream 34, to increase the likelihood of successful decoding—this will, in turn, ensure good cancellation of the data stream 34 in the next TRX iteration, thus improving the post equalization SINRs for the other data streams 34 being demodulated; and
- if the post equalization SINR for a particular data stream 34 is a long way off from the required SINR, then the TRX 26 generally considers it to be not worth allocating much of the demodulation processing resources 102 to the demodulation of the data stream 34—indeed, in some embodiments, the TRX 26 defers demodulation of low SINR data streams 34 until later TRX iterations, i.e., until other interference has been cancelled.

Now consider the case where the TRX 26 is using JD processing. One embodiment of the TRX 26 may be configured to view JD processing as inherently preferred over non-JD processing, at least in cases where the processing budget permits. Of course, the question of how much JD processing to perform remains. In at least one embodiment, the TRX 26 performs joint detection in one or more given TRX iterations of only a subset of all the substreams represented by the second number of data streams 34 selected for demodulation. In such embodiments, the TRX 26 does symbol-by-symbol demodulation (single detection) for the remaining substreams not included in the JD subset.

The "size" of the JD subset is chosen based on the demodulation processing resource budget 102. The task of the resource allocation control circuit 28 is to figure out which subset of substreams should be selected for JD processing. For this task, the resource control allocation circuit 28, or other associated circuitry in the TRX 26 computes a "vector SINR" measure that captures the quality of the joint detection. This vector SINR is then computed for all possible subsets of the same size. The TRX 26 then chooses the subset with the maximum vector SINR. For substreams within this subset, the TRX 26 performs JD processing, and for the substreams outside the subset, it performs single detection. (Such selective JD processing applies both to intra-stream JD and to inter-stream JD.)

One notable aspect of the above control of demodulation processing resource consumption is that it works for essentially any "flavor" JD processing implemented in the JD processing block(s) of the demodulation circuits 70 in one or more branches 46 of the TRX 26. That is, the control is applicable to tree search with m-algorithm, sphere decoding, multi-stage group detection (MSGD), etc. The demodulation processing resource budget 102 will then be a function of the complexity of the chosen JD approach and the setting of the appropriate complexity control parameter(s) used for the chosen approach, e.g., m-parameter, sphere size, etc.

Further, in at least one embodiment of the TRX 26, the total TDEC and demodulation constraints—i.e., the demodulation processing resource budget 102 and the TDEC processing resource budget 104—are considered jointly to determine the permissible $N_{TRX}$ value. Alternatively, the two areas of resource consumption may be optimized separately, the minimum of the two $N_{TRX}$ results is chosen, and the parameters of the other domain adjusted to fit the new allocation. Note that the relative processing load for a given iteration may have to be balanced for the TDEC and demodulation stages—configurations with heavy demodulation in early stages and heavy TDEC in subsequent stages require additional buffering/pipelining/memory transfers to utilize the available processing resources that may be prohibitive.

Incremental power consumption versus performance aspects may also be used as an additional criteria in the functions $F_i$. For example, for small TDEC block sizes, the choice of $N_{TRX}$ should be limited, considering the fact that, beyond some value, adding more TRX iterations provides only minor improvement, although it may be allowed by the total processing resource budget 100.

Further, the Turbo receiver principles set forth herein have direct applicability in many other scenarios and according to many other receiver architectures. Other MIMO configurations may be supported, e.g., the case of more layers than code-words. In addition to or instead of parallel MIMO streams, the Turbo-IC approach may mitigate interference due to a dispersive channel, other cells and/or users, etc. The IC operation may also be configured in different ways, e.g. via subtracting the total regenerated signal and adding back in branch-specific terms, or subtracting branch-specific regenerated impairment estimates.

The embodiments of the present invention therefore are not limited to a particular Turbo receiver structure or a certain Radio Access Technology (RAT). Further, among its numerous advantages, the present invention enables resource-efficient implementation of Turbo receivers with reduced hardware requirements, size, cost, and power. The available resources are maximally utilized for a variety of scenarios, transmission formats, and channel conditions. Moreover, the embodiments of the present invention are applicable to wireless device receivers, such as base station and UE receivers, and are RAT-independent.

In its various aspects and among its various advantages, the present invention solves the following problems in total TRX resource allocation: controlling total TDEC (and/or demodulation) complexity; optimizing resource distribution over several TRX branches; optimizing resource distribution over the TRX iterations; and dynamically updating the resource allocation choices at each TRX iteration, responsive to the current signal quality.

Thus, in one aspect, the present invention provides a method for processing resource allocation in Turbo receivers where the total number of TRX iterations to be performed and the subset of available resources to be expended at each iteration is determined adaptively, depending on at least one configuration parameter describing at least one of the signals to be detected by the Turbo receiver.

In some embodiments, the adaptive processing resource allocation includes one or more of: optimized resource distribution over two or more receiver branches; optimized resource distribution over two or more receiver iterations. In at least one such embodiment, the adaptive processing resource allocation over iterations is found via a tree search process (or equivalent). Further, in at least one such embodiment, the adaptive resource allocation is dynamically updated after one or more executed TRX iterations.

Still further, in any of the foregoing embodiments, the configuration parameters used to control resource allocation are one or more of the following: coding rate, code block length, signal quality, etc. Such allocation control applies to any one or more of: TDEC resources, demodulation resources, joint demodulation and TDEC resources.

Broadly, one aspect of the present invention is the advantageous recognition that instantaneous relative contributions of the per-branch demodulation, IC, and TDEC stages in converging towards a successful decoding outcome in a Turbo receiver depend heavily on the reception scenario (per-branch code rate, etc.) and the per-branch signal quality at the current Turbo Receiver (TRX) iteration. In turn, such recognition is used to flexibly configure a Turbo receiver, to improve receiver performance within the bounds of the total processing capability of the receiver.

Notably, modifications and other embodiments of the disclosed invention(s) will come to mind to one skilled in the art having the benefit of the teachings presented in the foregoing descriptions and the associated drawings. Therefore, it is to be understood that the invention(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

What is claimed is:

1. A method of iteratively processing a communication signal in a Turbo receiver, the method comprising:

receiving the communication signal, the communication signal conveying a first number of data streams;

performing a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and, canceling interference in the received communication signal in one or more of the Turbo receiver iterations, based on soft symbol estimates obtained from outcomes of the Turbo decoding; and dynamically controlling a processing resource consumption of the Turbo receiver within the defined processing time interval to increase a likelihood that all data streams that are of interest among the first number of data streams are successfully decoded without exceeding a total processing resource budget;

wherein said dynamically controlling the processing resource consumption of the Turbo receiver comprises at least one of: varying the total number of Turbo receiver iterations; varying the number of Turbo decoding iterations performed for any one or more of the demodulated data streams in each one of any one or more of the Turbo receiver iterations; and varying over any two or more of the Turbo receiver iterations a set size or set membership with respect to how many and which ones among the first number of data streams are included in the second number of the data streams;

wherein said dynamically controlling the processing resource consumption of the Turbo receiver further includes controlling how many Turbo decoding iterations are performed for any one or more of the demodulated data streams in any one or more of the Turbo receiver iterations as a function of at least one of per-data-stream coding rates and per-stream signal qualities; and wherein the method further comprises calculating the per-stream signal qualities to reflect one or both of actual signal quality improvements gained in any past Turbo receiver iterations, and projected signal quality improvements estimated for one or more future Turbo receiver iterations.

2. The method of claim 1, wherein said dynamically controlling the processing resource consumption of the Turbo receiver further includes terminating the Turbo receiver iterations responsive to successful decoding of the all data streams of interest irrespective of whether the total processing budget has been consumed, and responsive to consuming the total processing resource budget irrespective of whether the all data streams of interest have been successfully decoded.

3. The method of claim 1, wherein the first number of data streams includes a number M data streams that are of interest and a remaining number T of interfering data streams, and further wherein the Turbo receiver includes at least J receiver branches, each such receiver branch providing soft demodulation and Turbo decoding for each one of up to J data streams in each Turbo receiver iteration, and wherein method includes varying which ones and how many of the M data streams of interest and which ones and how many of the T interfering data streams are selected as the second number of data streams in any given one or more of the Turbo receiver iterations.

4. The method of claim 1, wherein there are J receiver branches used in the Turbo receiver, each one demodulating and decoding a respective one of the second number of data streams, and wherein dynamically controlling the processing resource consumption of the Turbo receiver further comprises, in any given one of the Turbo receiver iterations, evaluating a resource allocation function that represents a tree structure, wherein each node in the tree structure represents a set of signal quality metrics for the J receiver branches, and each tree branch extending between a first node at one level of the tree structure and a second node at a next, higher level in the tree structure comprises a candidate allocation of processing resources for Turbo decoding in the J receiver branches, such that the evaluating of the resource allocation function comprises performing a tree search of depth D to find the node having a best aggregate performance measure with respect to a subset M of the J receiver branches that is used for demodulating and decoding all the data streams of interest, or to find the node at a minimum depth that satisfies defined quality targets for all the data streams of interest.

5. The method of claim 1, wherein said dynamically controlling the processing resource consumption of the Turbo receiver further comprises controlling the number of Turbo decoding iterations performed on each of the demodulated data streams according to a resource allocation function that considers signal qualities of the demodulated data streams, so that those demodulated data streams having signal qualities within a target quality range are allocated, or are at least biased towards being allocated, a higher number of Turbo decoding iterations as compared to those demodulated data streams having signal qualities above or below the target quality range.

6. The method of claim 1, wherein said dynamically controlling the processing resource consumption of the Turbo receiver further comprises controlling the number of Turbo decoding iterations performed on each of the demodulated data streams according to a resource allocation function that considers coding rates of the demodulated data streams, so that those demodulated data streams having coding rates below an upper threshold are allocated, or are at least biased towards being allocated, a higher number of Turbo decoding iterations as compared to those demodulated data streams having coding rates above the upper threshold.

7. The method of claim 1, wherein said dynamically controlling the processing resource consumption of the Turbo receiver further comprises controlling the number of Turbo decoding iterations performed on each of the demodulated data streams according to a resource allocation function that considers a progression of the Turbo receiver iterations, so that the demodulated data streams are allocated, or are at least biased towards being allocated, a lower number of Turbo decoding iterations during an initial Turbo receiver iteration, or during one or more of the earliest Turbo receiver iterations, and then are allocated, or are at least biased towards being allocated, a higher number of Turbo decoding iterations during a last Turbo receiver iteration, or during one or more of the subsequent Turbo receiver iterations.

8. The method of claim 1, wherein said dynamically controlling the processing resource consumption of the Turbo receiver further comprises varying an allocation of demodulator circuit resources used over two or more of the Turbo receiver iterations, to further increase the likelihood that the all data streams of interest among the first number of data streams are successfully decoded without exceeding the total processing resource budget.

9. The method of claim 1, wherein said dynamically controlling the processing resource consumption of the Turbo receiver further comprises at least one of: deciding, for any one or more of the Turbo receiver iterations, whether to use single detection or joint detection of substreams in the second number of data streams selected for demodulation; and configuring the complexity of joint detection when joint detection processing is being used.

10. A method of iteratively processing a communication signal in a Turbo receiver, the method comprising:
receiving the communication signal, the communication signal conveying a first number of data streams;
performing a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and, canceling interference in the received communication signal in one or more of the Turbo receiver iterations, based on soft symbol estimates obtained from outcomes of the Turbo decoding; and
dynamically controlling a processing resource consumption of the Turbo receiver within the defined processing time interval to increase a likelihood that all data streams that are of interest among the first number of data streams are successfully decoded without exceeding a total processing resource budget;
wherein said dynamically controlling the processing resource consumption of the Turbo receiver comprises at least one of: varying the total number of Turbo receiver iterations; varying the number of Turbo decoding iterations performed for any one or more of the demodulated data streams in each one of any one or more of the Turbo receiver iterations; and varying over any two or more of the Turbo receiver iterations a set size or set membership with respect to how many and which ones among the first number of data streams are included in the second number of the data streams; and
wherein in any given one of the Turbo receiver iterations, operation of the Turbo receiver comprises:
demodulating each one of the second number of data streams from the updated received communication signal in a corresponding receiver branch of the Turbo receiver;
estimating an average soft value magnitude for each demodulated data signal as a signal quality metric for the demodulated data signal;
calculating per-branch processing resource allocations for Turbo decoding the demodulated data streams in their corresponding receiver branches by evaluating an allocation function that depends on the signal quality metrics and a remaining processing resource budget determined as a difference between the total processing resource budget and an accumulated processing resource consumption accumulated over any prior Turbo receiver iterations;
Turbo decoding each of the demodulated data streams according to the per-branch processing resource allocations calculated for Turbo decoding;

mapping soft bit values produced from the Turbo decoding in each receiver branch to corresponding soft symbol estimates and combining the soft symbol estimates with the updated received signal to obtain the updated received signal for use in the next Turbo receiver iteration; and updating the accumulated processing resource consumption to reflect the processing resources used in the current iteration.

11. A method of iteratively processing a communication signal in a Turbo receiver, the method comprising:

receiving the communication signal, the communication signal conveying a first number of data streams;

performing a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and, canceling interference in the received communication signal in one or more of the Turbo receiver iterations, based on soft symbol estimates obtained from outcomes of the Turbo decoding; and dynamically controlling a processing resource consumption of the Turbo receiver within the defined processing time interval to increase a likelihood that all data streams that are of interest among the first number of data streams are successfully decoded without exceeding a total processing resource budget;

wherein said dynamically controlling the processing resource consumption of the Turbo receiver comprises at least one of: varying the total number of Turbo receiver iterations; varying the number of Turbo decoding iterations performed for any one or more of the demodulated data streams in each one of any one or more of the Turbo receiver iterations; and varying over any two or more of the Turbo receiver iterations a set size or set membership with respect to how many and which ones among the first number of data streams are included in the second number of the data streams; and wherein each one of the second number of data streams is demodulated in a corresponding receiver branch of the Turbo receiver, each receiver branch demodulating and Turbo decoding the corresponding one of the second number of data streams, and wherein dynamically controlling the processing resource consumption of the Turbo receiver comprises allocating, for all Turbo receiver iterations, an equal and constant amount of processing resources to each Turbo decoding iteration in each receiver branch, and therefore controlling the processing resource consumption of the Turbo receiver by controlling the total number of Turbo receiver iterations in combination with controlling the number of Turbo decoding iterations performed in each such Turbo receiver iteration.

12. A Turbo receiver comprising:

a number of demodulation circuits and corresponding Turbo decoder circuits arranged in one or more receiver branches;

the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams;

wherein the resource allocation control circuit is configured to dynamically control the processing resource consumption of the Turbo receiver by being configured to control how many Turbo decoding iterations are performed for any one or more of the demodulated data streams in any one or more of the Turbo receiver iterations as a function of at least one of per-data-stream coding rates and per-stream signal qualities; and wherein the resource allocation control circuit is further configured to calculate the per-stream signal qualities to reflect one or both of actual signal quality improvements gained in any previous Turbo receiver iterations, and projected signal quality improvements estimated for one or more future Turbo receiver iterations.

13. The Turbo receiver of claim 12, wherein the resource allocation control circuit is configured to dynamically control the processing resource consumption of the Turbo receiver by being further configured to terminate the Turbo receiver iterations responsive to successful decoding of the all data streams of interest irrespective of whether the total processing budget has been consumed, and responsive to consumption of the total processing resource budget irrespective of whether the all data streams of interest have been successfully decoded.

14. The Turbo receiver of claim 12, wherein there are J receiver branches used in the Turbo receiver, each one demodulating and decoding a respective one of the second number of data streams, and wherein the resource allocation control circuit is configured to dynamically control the processing resource consumption of the Turbo receiver by being further configured to, for any given one of the Turbo receiver iterations, evaluate a resource allocation function that represents a tree structure, wherein each node in the tree structure represents a set of signal quality metrics for the J receiver branches, and each tree branch extending between a first node at one level of the tree structure and a second node at a next, higher level in the tree structure comprises a candidate allocation of processing resources for Turbo decoding in the J receiver branches, such that the evaluating of the resource allocation function comprises the resource allocation control circuit performing a tree search of depth D to find the node having a best aggregate performance measure with respect to a subset M of the J receiver branches that is used for demodulating and decoding all the data streams of interest, or to find the node at a minimum depth that satisfies defined quality targets for all the data streams of interest.

15. The Turbo receiver of claim 12, wherein the resource allocation control circuit is configured to control the processing resource consumption of the Turbo receiver by being further configured to control the number of Turbo decoding iterations performed on each of the demodulated data streams according to a resource allocation function that considers signal qualities of the demodulated data streams, so that those demodulated data streams having signal qualities within a target quality range are allocated, or are at least biased towards being allocated, a higher number of Turbo decoding iterations as compared to those demodulated data streams having signal qualities above or below the target quality range.

16. The Turbo receiver of claim 12, wherein the resource allocation control circuit is configured to control the processing resource consumption of the Turbo receiver by being further configured to control the number of Turbo decoding iterations performed on each of the demodulated data streams according to a resource allocation function that considers coding rates of the demodulated data streams, so that those demodulated data streams having coding rates below an upper threshold are allocated, or are at least biased towards being allocated, a higher number of Turbo decoding iterations as compared to those demodulated data streams having coding rates above the upper threshold.

17. The Turbo receiver of claim 12, wherein the resource allocation control circuit is configured to dynamically control the processing resource consumption of the Turbo receiver further by varying an allocation of the demodulation circuits used over two or more of the Turbo receiver iterations, to further increase the likelihood that the all data streams of interest among the first number of data streams are successfully decoded without exceeding the total processing resource budget.

18. A Turbo receiver comprising:
a number of demodulation circuits and corresponding Turbo decoder circuits arranged in one or more receiver branches;
the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and
the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams; and
wherein the first number of data streams includes a number M data streams that are of interest and a remaining number T of interfering data streams, and further wherein the Turbo receiver includes at least J receiver branches, each such receiver branch providing soft demodulation and Turbo decoding for each one of up to J data streams in each Turbo receiver iteration, and wherein the resource allocation control circuit is configured to vary which ones and how many of the M data streams of interest and which ones and how many of the T interfering data streams are selected as the second number of data streams for any given one or more of the Turbo receiver iterations.

19. A Turbo receiver comprising:
a number of demodulation circuits and corresponding Turbo decoder circuits arranged in one or more receiver branches;
the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and
the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams; and
wherein, for any given one of the Turbo receiver iterations, the Turbo receiver is configured to:
demodulate each one of the second number of data streams from the updated received communication signal in a corresponding receiver branch of the Turbo receiver;
estimate an average soft value magnitude for each demodulated data stream as a signal quality metric for the demodulated data stream;
calculate per-branch processing resource allocations for Turbo decoding the demodulated data streams in their corresponding receiver branches by evaluating an allocation function that depends on the signal quality metrics and a remaining processing resource budget determined as a difference between the total processing resource budget and an accumulated processing resource consumption accumulated over any prior Turbo receiver iterations;

Turbo decode each of the demodulated data streams according to the per-branch processing resource allocations calculated for Turbo decoding;

map soft bit values produced from the Turbo decoding in each receiver branch to corresponding soft symbol estimates and combine the soft symbol estimates with the updated received signal to obtain the updated received signal for use in the next Turbo receiver iteration; and update the accumulated processing resource consumption to reflect the processing resources used in the current iteration.

20. A Turbo receiver comprising:

a number of demodulation circuits and corresponding Turbo decoder circuits arranged in one or more receiver branches;

the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams;

wherein each one of the second number of data streams is demodulated in a corresponding receiver branch of the Turbo receiver, each receiver branch demodulating and Turbo decoding the corresponding one of the second number of data streams, and wherein the resource allocation control circuit is configured to dynamically control the processing resource consumption of the Turbo receiver by being configured to allocate, for all Turbo receiver iterations, an equal and constant amount of processing resources to each Turbo decoding iteration in each receiver branch, and therefore control the processing resource consumption of the Turbo receiver by controlling the total number of Turbo receiver iterations in combination with controlling the number of Turbo decoding iterations performed in each such Turbo receiver iteration.

21. A Turbo receiver comprising:

a number of demodulation circuits and corresponding Turbo decoder circuits arranged in one or more receiver branches;

the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams;

wherein the resource allocation control circuit is configured to control the processing resource consumption of the Turbo receiver by being configured to control the number of Turbo decoding iterations performed on each of the demodulated data streams according to a resource allocation function that considers a progression of the Turbo receiver iterations, so that the demodulated data streams are allocated, or are at least biased towards being allocated, a lower number of Turbo decoding iterations during an initial Turbo receiver iteration, or during one or more of the earliest Turbo receiver iterations, and then are allocated, or are at least biased towards being allocated, a higher number of Turbo decoding iterations during a last Turbo receiver iteration, or during one or more of the subsequent Turbo receiver iterations.

22. A Turbo receiver comprising:

a number of demodulation circuits and corresponding Turbo decoder circuits arranged in one or more receiver branches;

the Turbo receiver configured to receive a communication signal conveying a first number of data streams, and to perform a total number of Turbo receiver iterations for the received communication signal within a defined processing time interval, each Turbo receiver iteration including demodulating a second number of the data streams from the received communication signal and Turbo decoding each one of the corresponding demodulated data streams using a number of Turbo decoding iterations, and canceling interference in the received communication signal in one or more of the Turbo receiver iterations, based on soft symbol estimates obtained from outcomes of the Turbo decoding; and the Turbo receiver further comprising a resource allocation control circuit that is operatively associated with the one or more receiver branches, and wherein the resource allocation control circuit is configured to dynamically control a processing resource consumption of the Turbo receiver within the defined processing time interval to increase a likelihood that all data streams that are of interest among the first number of data streams are successfully decoded without exceeding a total processing resource budget, based on being configured to vary at least one of: the total number of Turbo receiver iterations; the number of Turbo decoding iterations performed for any one or more of the demodulated data streams in each one of any one or more of the Turbo receiver iterations; and a set size or set membership with respect to how many and which ones among the first number of data streams are included in the second number of the data streams;

wherein the resource allocation control circuit is configured to dynamically control the processing resource consumption of the Turbo receiver by being further configured to control at least one of: whether, for any one or more of the Turbo receiver iterations, demodulation is performed using single detection or joint detection of substreams in the second number of data streams selected for demodulation; and the complexity of joint detection when joint detection processing is being used.

* * * * *

UNITED STATES PATENT AND TRADEMARK OFFICE
CERTIFICATE OF CORRECTION

PATENT NO. : 8,675,785 B2  Page 1 of 1
APPLICATION NO. : 13/470638
DATED : March 18, 2014
INVENTOR(S) : Reial et al.

It is certified that error appears in the above-identified patent and that said Letters Patent is hereby corrected as shown below:

In the Specification

In Column 16, Line 49, delete " $\{Q_{k+1}^{(j)}\}_j = H(\{Q_{TDEC,k}^{(j)}\}_j)$ " and insert -- $\{Q_{k+1}^{(j)}\}_j = G(\{Q_k^{(j)}\}_j, \{N_{TDEC,k}^{(j)}\}_j)$ --, therefor In Column 19, Line 16, delete "F₁" and insert -- $F_i$ --, therefor.

Signed and Sealed this
Fifteenth Day of July, 2014

Michelle K. Lee
*Deputy Director of the United States Patent and Trademark Office*